United States Patent [19]

Clark et al.

[11] Patent Number: 4,797,516

[45] Date of Patent: Jan. 10, 1989

[54] MOLDINGS FOR ISOLATION SWITCH AND FUSE CLIPS

[75] Inventors: Michael R. Clark; Gerald J. Kuiper, both of Columbia; Donald B. Monson, Eastover; Dominick Tringali, Columbia, all of S.C.

[73] Assignee: Square D Company, Palatine, Ill.

[21] Appl. No.: 18,767

[22] Filed: Mar. 3, 1987

Related U.S. Application Data

[63] Continuation of Ser. No. 754,873, Jul. 12, 1985, abandoned.

[51] Int. Cl.⁴ .............................................. H01R 13/70
[52] U.S. Cl. .................................. 200/51 R; 361/347
[58] Field of Search ............ 200/51 R, 296; 361/347, 361/355, 357, 360, 361; 174/52 R, 99 R, 99 B; 339/22 B, 249 R, 249 A, 198 N, 198 G

[56] References Cited

U.S. PATENT DOCUMENTS

| | | | |
|---|---|---|---|
| 1,228,839 | 6/1917 | Siebenhauer | 361/361 |
| 2,766,405 | 10/1956 | Edmunds | 361/361 |
| 2,970,245 | 1/1961 | Weimer et al. | 200/51 R |
| 3,694,701 | 9/1972 | Stanback | 339/198 N |
| 4,090,230 | 5/1978 | Fuller et al. | 361/345 |

Primary Examiner—Henry J. Recla
Assistant Examiner—Linda J. Sholl

Attorney, Agent, or Firm—Richard T. Guttman; A. Sidney Johnston

[57] ABSTRACT

An electric switch has a first molding for supporting an isolation switch and at least one line side power fuse clip, where the line fuse clip is capable of retaining a first end of a power fuse fed by the isolation switch. A second molding for supporting at least one load side power fuse clip is provided, where the load fuse clip is capable of retaining a second end of the power fuse. At least one projection is formed into the second molding for supporting a control circuit fuse, where the projection is substantially parallel to and beside an installed power fuse, and a control circuit line side fuse clip and a corresponding load side clip is mounted to each of the projections formed into the second molding, so that installed control and power fuses are spaced apart and substantially parallel. A conductor behind a terminal of the power fuse connects the load side power fuse clip to the control circuit line side fuse clip. A socket may be formed in a top surface of the first molding, and the line side power fuse clip may be attached to a lower surface of the first molding, so that a bus bar may be supported above the first molding. The isolation switch may control a three phase line. Projections are molded into the first molding in order to provide insulation between conductive compartments for each phase.

12 Claims, 25 Drawing Sheets

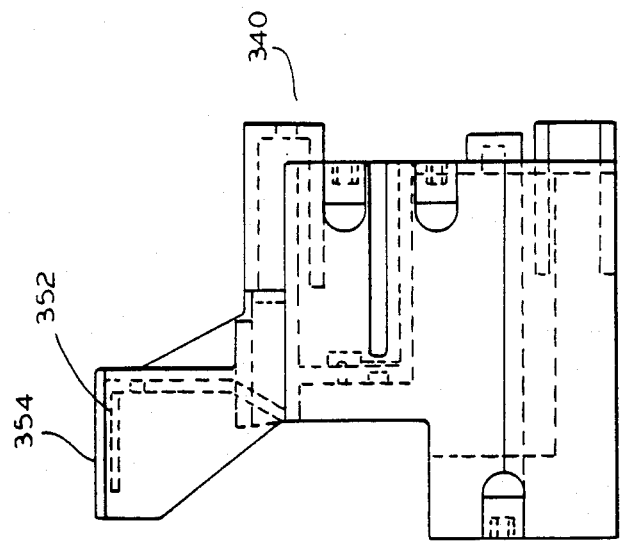
FIG. 27
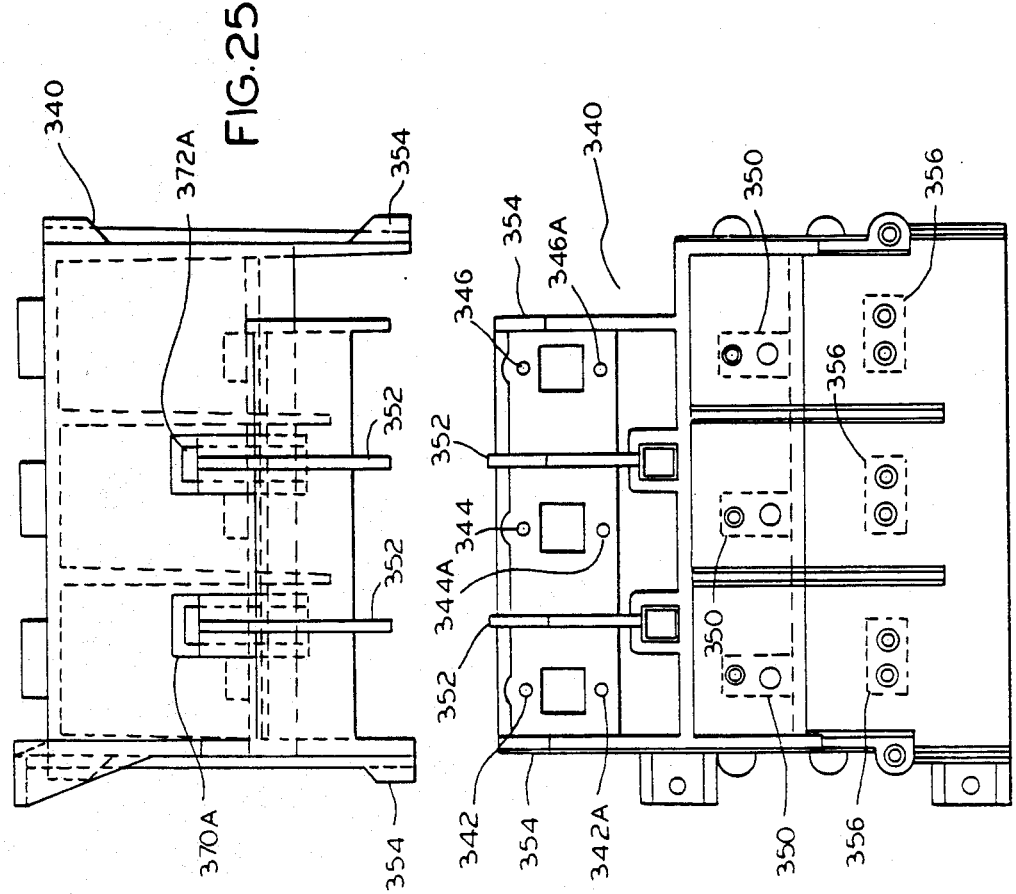
FIG. 25
FIG. 26

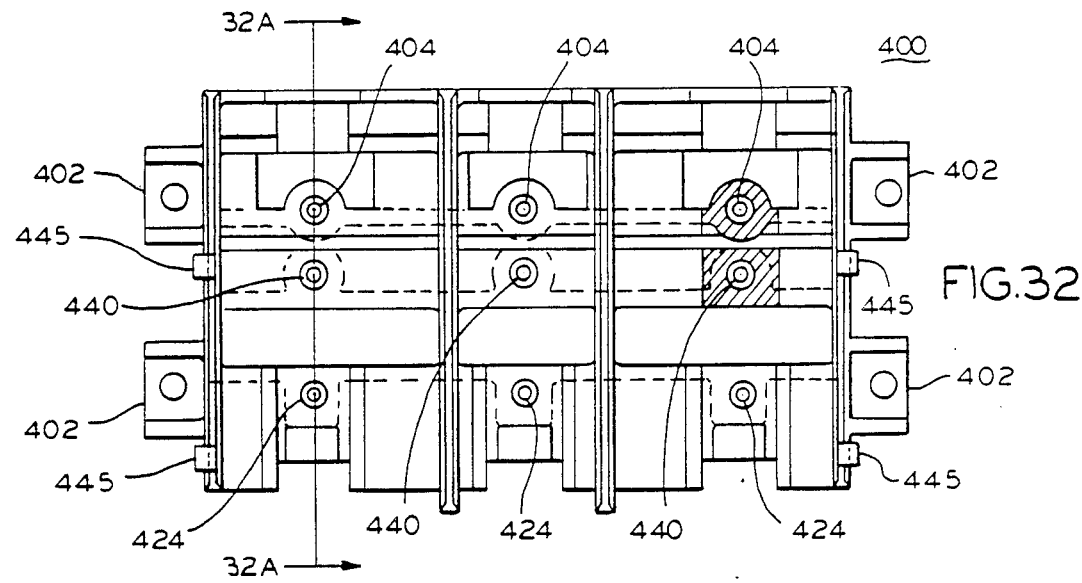
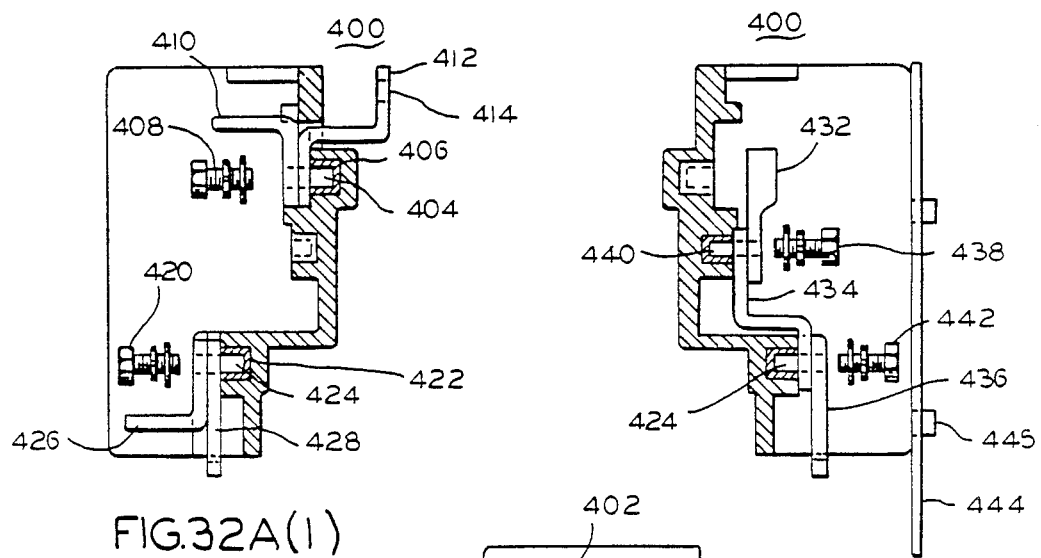
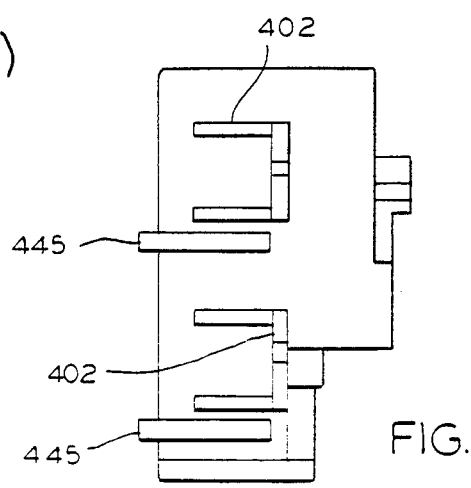

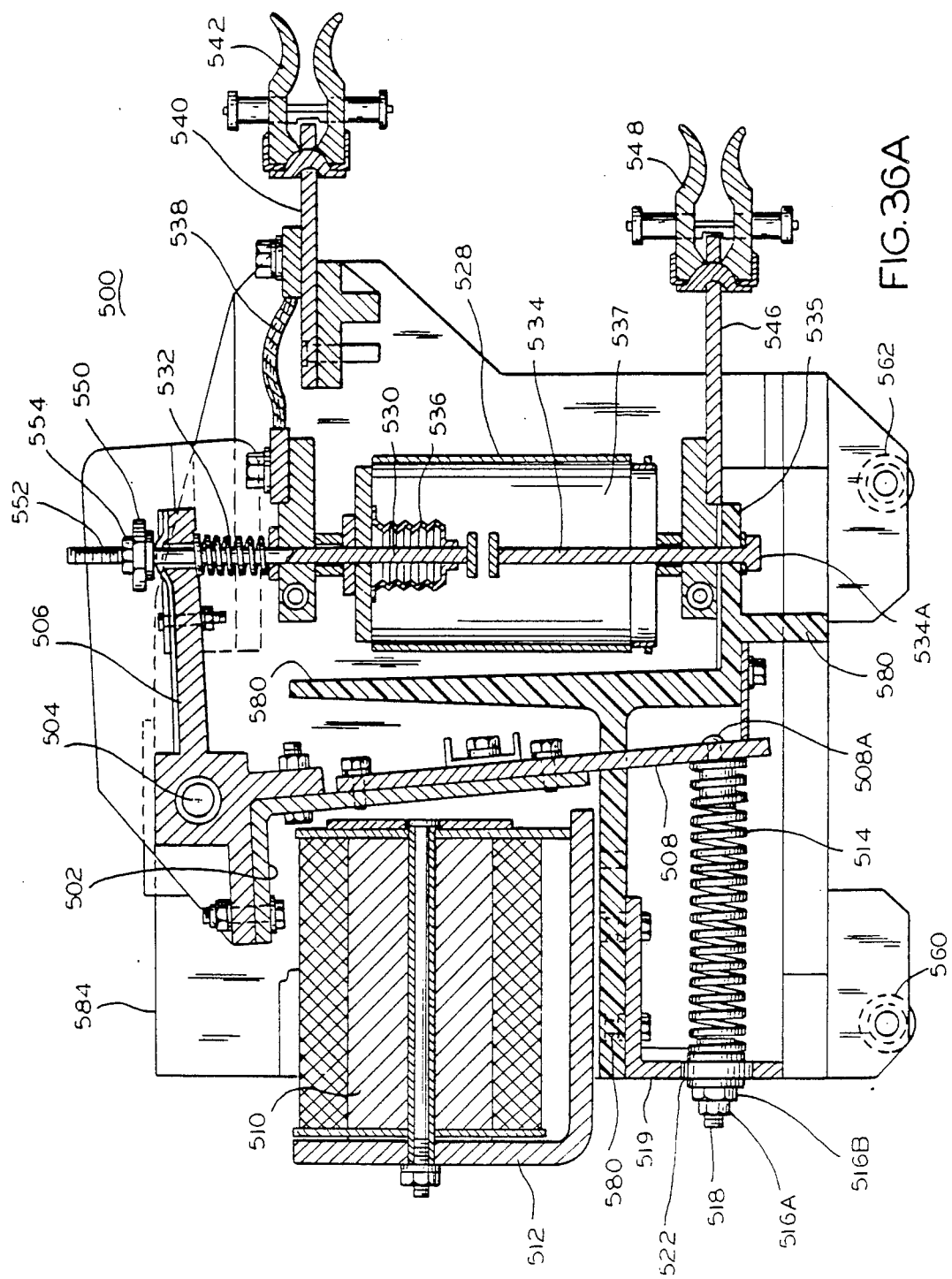

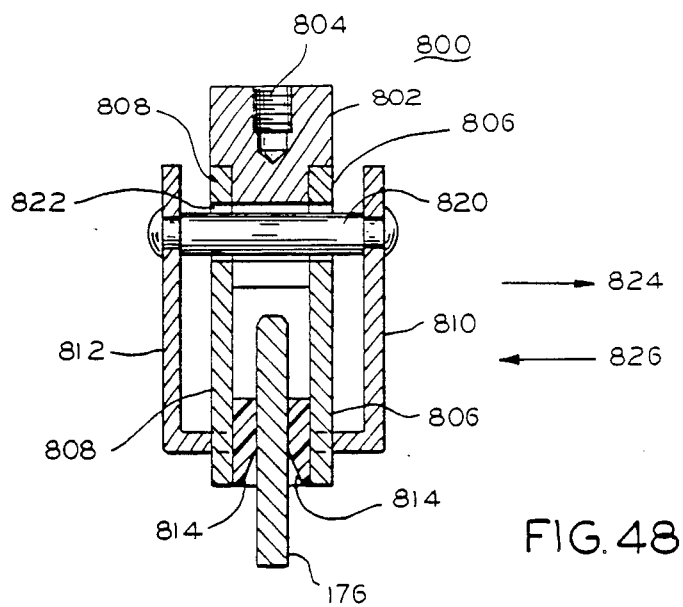
FIG. 48
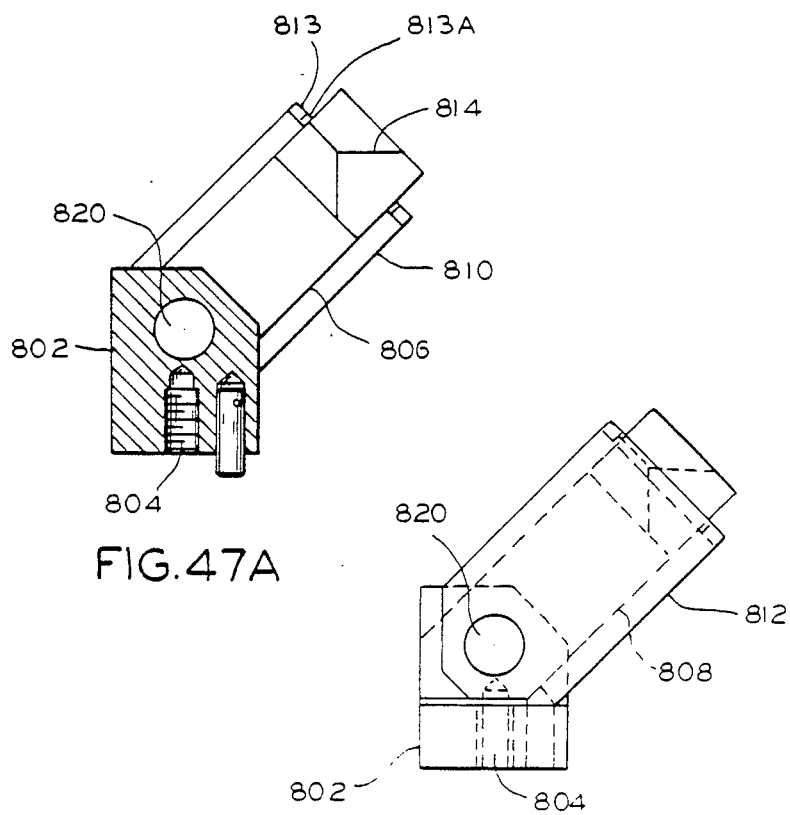
FIG. 47A
FIG. 47B

MOLDINGS FOR ISOLATION SWITCH AND FUSE CLIPS

This application is a continuation of application Ser. No. 754,873 filed on July 12, 1985, now abandoned.

FIELD OF THE INVENTION

This invention relates to moldings for an isolation switch and for fuse clips, and in particular to moldings providing safe placement of leads between electrical components.

BACKGROUND OF THE INVENTION

Moldings used in the past for isolation switches and for fuse clips have required interconnection between a molding for an isolation switch and a molding for a fuse clip. The interconnection provides unnecessary parts in an enclosure containing an isolation switch and other electrical components, and also provides a hazard for a workman as more exposed terminals must necessarily be located within an enclosure.

Also, bus bar conductors have in the past required support, and have required interconnection to an isolation switch. A continuing problem has been to provide a safe support for bus bar conductors while maintaining a desired spacing between the conductor, and at the same time providing a convenient electrical connection to an isolation switch.

A further difficulty with moldings used for power fuse clips in a controller is that the conductor from the load terminal of a power fuse to a control circuit fuse clip is fused with only the power fuse. The conductor from the load side of a power fuse to the line side of the control circuit fuse is typically fused for several hundred Amperes, rather than the 15 Amperes typically used to fuse a control circuit. Thus, the lead from the load side terminal of the power fuse to the control circuit fuse may present a hazard to a person working within an enclosure containing the controller.

SUMMARY OF THE INVENTION

The invention provides moldings for an isolation switch, for bus bar supports, for upper power fuse clips, for lower power fuse clips, and for control circuit fuse clips which provide a convenient mounting arrangement. An electric switch apparatus has a first molding for supporting an isolation switch and for supporting at least one line side power fuse clip, where the at least one line side power fuse clip is capable of retaining a first end of a power fuse fed by the isolation switch. A second molding for supporting at least one load side power fuse clip is provided, where the at least one load side power fuse clip is capable of retaining a second end of the power fuse fed by the isolation switch. At least one projection is formed into the second molding for supporting a control circuit fuse, where the at least one projection is substantially parallel to and beside a power fuse when a power fuse is installed in the apparatus, and a control circuit line side fuse clip and a corresponding control circuit load side fuse clip is mounted to each of the projections formed into the second molding, so that a control fuse and a power fuse are spaced apart and substantially parallel when both are installed in the apparatus. A conductor for connecting the load side power fuse clip to the control circuit line side fuse clip is arranged to be substantially behind a terminal of the power fuse. A socket may be formed in a top surface of the first molding, and the line side power fuse clip may be attached to a lower surface of the first molding, so that a bus bar may be supported on a post mounted in the socket, and the bus bar supported above the first molding. The isolation switch may control a three phase alternating current line. Projections are molded into the first molding in order to provide insulation between compartments having contacts and blades for each of the respective alternating current phases.

Other and further aspects of the present invention will become apparent in the course of the following description and by reference to the accompanying drawings.

BRIEF DESCRIPTION OF THE DRAWINGS

Referring now to the drawings in which like numerals represent like parts in the several views:

FIG. 25, FIG. 26 and FIG. 27 are top, front, and side views, respectively, of a molding for an isolation switch.

FIG. 32 is a front view of a molding useful as a receptacle for a contactor.

FIG. 32A(1) and FIG. 32A(2) are cross sectional drawings of alternate embodiments of a molding as shown in FIG. 32.

FIG. 33 is a side view of a molding as shown in FIG. 32.

FIG. 36A and FIG. 36B are a cross sectional view of a vacuum break contactor.

FIG. 47A is a sectional view of a jaw for a stationary contact for a blade switch.

FIG. 47B is a side view of a jaw for a stationary contact for a blade switch.

FIG. 48 is a sectional view of a jaw for a stationary contact for a blade switch.

DETAILED DESCRIPTION

Figure 1:
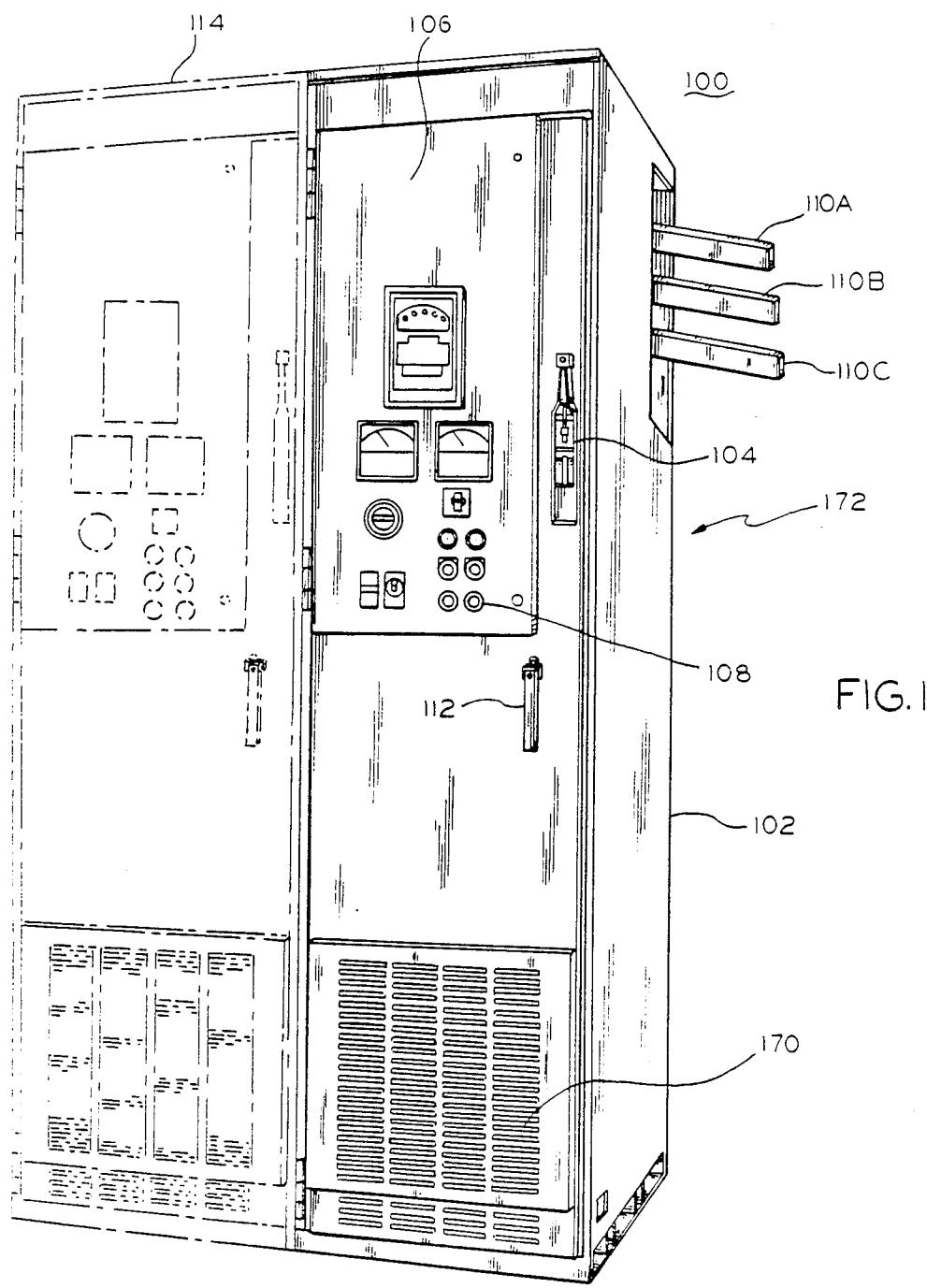
FIG. 1 shows a medium voltage controller, and a second controller in dotted lines ganged to the first controller.

A controller 100 for medium voltage applications is shown in FIG. 1. For example, the controller may be used as a motor controller for controlling the current flow to an electric motor. The controller as shown in FIG. 1 is, for example, suitable for controlling current flow to a three phase electric motor where the voltages involved are in the kilovolts range, and the currents involved are in the 300 ampere to 400 ampere range.

Operating handle 104 is used to operate an isolation switch (not shown in FIG. 1). Meters 106 are used to indicate electrical quantities such as, for example, voltage applied to a load, current flow into a load, power flow into a load, reactive power flow into a load, and other electrical quantities for which an indication is desired. Operating buttons 108 may be used, for example, to activate an electromagnetic contactor to make and break the circuit to a load. Conductors 110a, 110b, and 110c, for example, are three phase bus bars for bringing electrical current into controller 100.

An optional ganged controller is shown in dotted lines. A number of controllers my be ganged together as shown by ganged controller 114, and power conveniently delivered to each by conductors 110a, 110b, 110c passing through the various ganged controllers.

Figure 2:
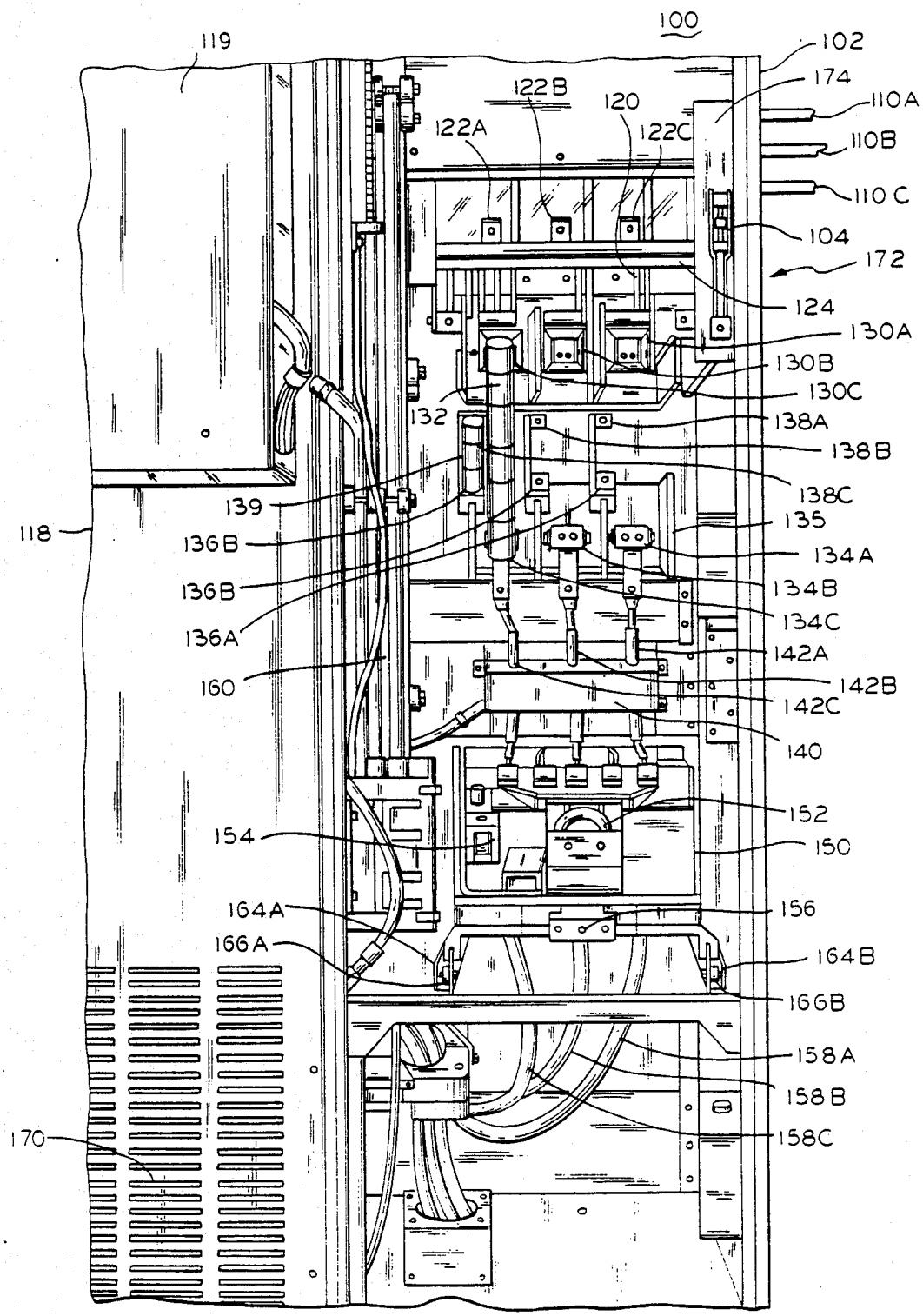
FIG. 2 shows the interior of a medium voltage controller as seen with the door open.

FIG. 2 shows the interior of controller 100 with door 118 standing open. Enclosed instrument panel 119 is mounted upon door 118. Enclosed instrument panel 119 protects the wiring and the meters for instruments 106 from exposure to the high voltage conductors within enclosure 100. Bus bars 110a, 110b and 110c deliver electric current to controller 100. Isolation switch 120 connects to the bus bars through connector 122a, to bus bar 110a, connector 122b to bus bar 110b, and connector 122c to bus bar 110c. Operating handle 104 is used to open or close isolation switch 120. The load side of isolation switch 120 connects to upper power fuse clips 130a, 130b and 130c. Fuse 132 is shown installed in fuse clip 130c. The load side of fuse 132 connects to lower power fuse clips 134c. Also, lower power fuse clips 134a and 134b are shown. Lower power fuse clips 134a, 134b, 134c are mounted in molding 135. Also mounted in molding 135 are control circuit line side fuse clips 136a, 136b and 136c. Control circuit load side fuse clips 138a, 138b and 138c are also mounted in molding 135. A control circuit fuse 139 is shown installed between control circuit line side fuse clip 136c and control circuit load side fuse clip 138c. Conductors 142a, 142b and 142c connect lower power fuse clips 134a, 134b and 134c to the terminals of contactor 150. Contactor 150 as shown in FIG. 2 is a vacuum break contactor using vacuum break bottles. Alternatively, an air break contactor may be used for contactor 150. Conductors 142a, 142b and 142c pass through current transformer 140. For example, current transformer 140 may be three separate current transformer windings, one for each of the conductors 142a, 142b, 142c, and all three windings encapsulated in a single package.

Contactor 150, drawn as a contactor using vacuum break bottles, has operating coil 152 and contactor control components 154 mounted for easy access when door 118 of enclosure 102 is open, as shown in FIG. 2. Contactor spring adjustment 156 also is easily accessible through open door 118, and provides a means for relaxing forces on the contactor operating spring.

Rails 164a and 164b provide a convenient means for sliding contactor 150 into place in enclosure 102. Contactor 150 has wheels 166a and 166b in order to facilitate mounting and demounting of contactor 150 in enclosure 102.

Cabling 160 provides a means for a customer to connect a load to the load side of contactor 150 through cables 158a, 158b and 158c.

Louvers 170 in door 118 provide a means for air to enter enclosure 102 in order to provide cooling circulating air.

A control transformer (not shown) for providing electrical current to the control components of controller 100 may conveniently be connected to control circuit load side fuse clips 138a, 138b, 138c.

Figure 3:
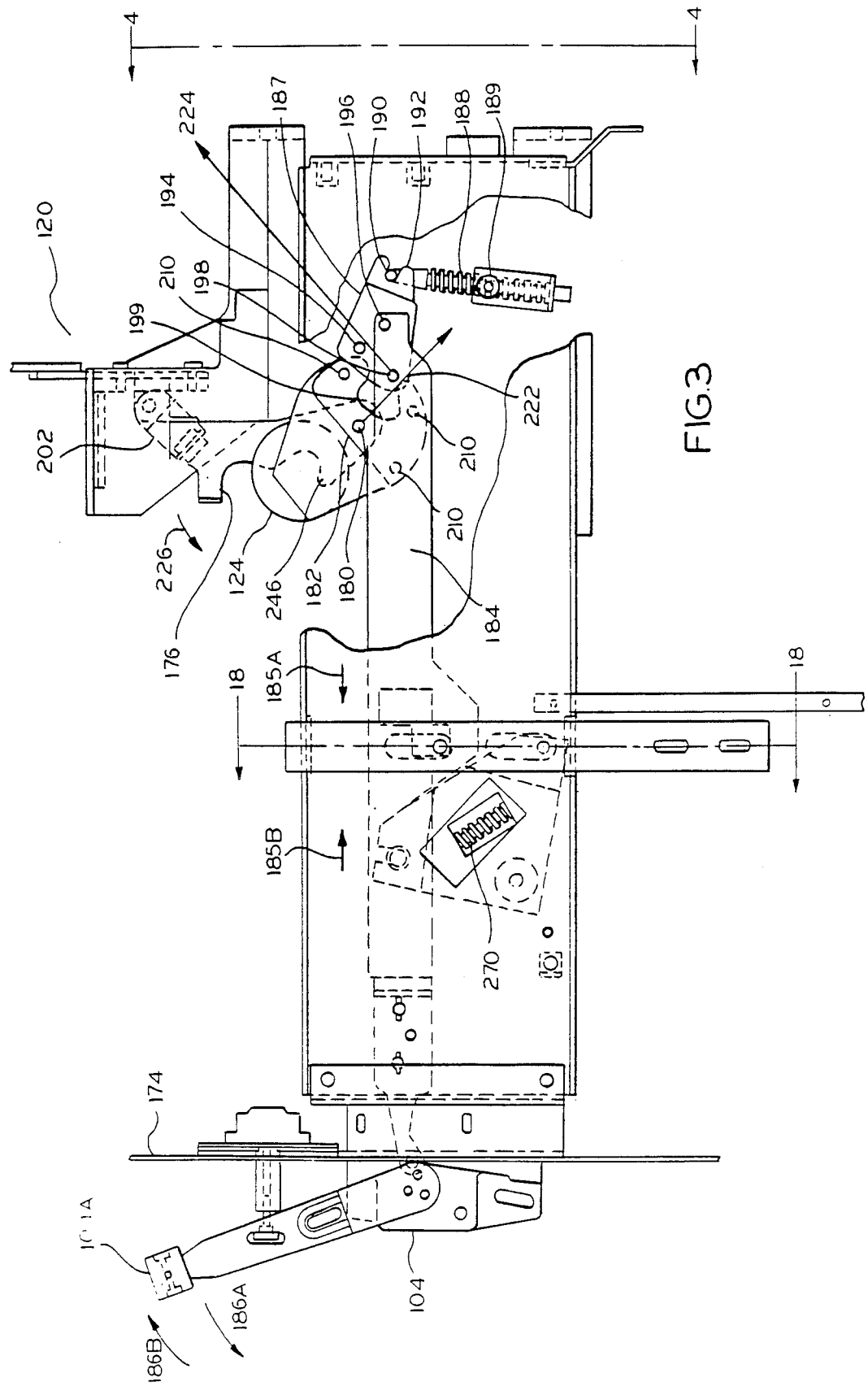
FIG. 3 is a detailed view of a isolation switch operating mechanism.

A partil operational diagram of an assembly for handle 104 to operate isolation switch 120 is shown in FIG. 3. FIG. 3 gives a view of the operating mechanism taken in the direction of arrow 172 as shown in FIG. 1 and FIG. 2. Handle 104 is shown attached to mounting plate 174. Blades 176 of isolation switch 120 are shown in the closed position in FIG. 3. Bail arm 124 rotates about axle 180. Cams 182, 182A are, for example, a metal plate attached to bail arm 124, and cam 182 provides a hardened surface for the operating mechanism to drive rotation of the bail arm 124. Link 184 is moved in the direction of arrow 185a, or in the direction of arrow 185b, by rotational motion of hand lever 104a. Motion of hand lever 104a of handle 104 in the direction shown by arrow 186a moves link 184 in the direction of arrow 185a. Motion of hand lever 104a in the direction shown by arrow 186b moves link 184 in the direction shown by arrow 185b. Motion of link 184 causes rotation of operating cam 187 about axle 194. Toggle spring 188 applies force to pin 190 thereby applying force to the inner surface of slot 192 in operating cam 187. In the position shown in FIG. 3, toggle spring 188 urges operating cam 187 to rotate about axle 194 in a counterclockwise sense, as viewed from FIG. 3, which rotational sense tends to urge pin 190 upwardly in FIG. 3.

Link 184 is coupled to operation cam 187 by drive pin 196.

Rotation of hand lever 104a in the direction shown by arrow 186b tends to move link 184 in the direction shown by arrow 185b and to consequently urge rotation of operating cam 187 in the counterclockwise direction, as does toggle spring 188 in the view as shown in FIG. 3.

Motion of hand lever 104a in the direction shown by arrow 186a urges link 184 to move in the direction shown by arrow 185a, and consequently urges operating cam 187 to rotate in the clockwise direction, that is it tends to urge pin 190 to move downwardly as shown in FIG. 3 and compress toggle spring 188. Clockwise rotation of operating cam 187 moves cam pin 198 into contact with surface 199 of bail arm cam 182. Pressure by cam pin 198 against surface 199 of bail arm cam 182 urges rotation of bail arm 124 in a counterclockwise direction about axle 180, thereby urging blade 176 to disengage from stationary contact 202. Thus, motion of hand lever 104a in the direction shown by arrow 186a tends to open isolation switch 120.

Mounting screws 210 attach bail arm cam 182 to bail arm 124.

Bail arm cam 182 in cooperation with operating cam 187 tends to lock blade 176 in the closed position in the presence of forces tending to rotate blade 176 in the direction shown by arrow 226.

Figure 14:
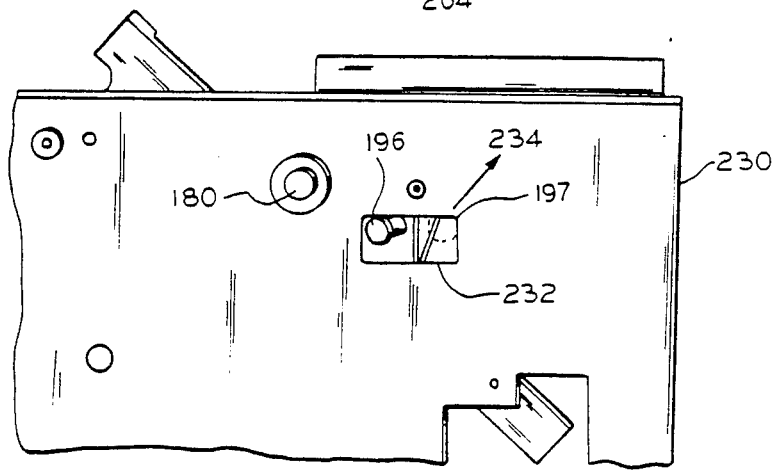
FIG. 14 is a perspective view of an isolation switch operating mechanism.

Rotation of blade 176 in the direction shown by arrow 226 by means of forces applied to blade 176 causes surface 222 of bail arm cam 182 to press against cam pin 198. Pressure by surface 222 against cam pin 198 produces force on cam pin 198 in the direction shown by arrow 224. Arrow 224 passes to the right of the center of axle 194 and therefore urges rotation of operating cam 187 in the counterclockwise direction. Operating cam 187 is prevented from further counterclockwise rotation than the position shown in FIG. 3 by the interaction of drive pin 196 with opening 232 in place 230, as can better be understood by reference to FIG. 14. As shown in FIG. 14, plate 230 is fixedly attached to enclosure 102 of controller 100. Opening 232 in plate 230 accepts drive pin 196. Drive pin 196 is in position 197, as shown in dotted lines, when the operating mechanism is in the position as shown in FIG. 3. Further, counterclockwise rotation of operating cam 187 about axle 194 from the position shown in FIG. 3 causes drive pin 196 to exert force against plate 230 in the direction shown by arrow 234. Plate 230 does not move under the influence of forces in the direction shown by arrow 234 and thereby prevents further rotation of operating cam 187 in the counterclockwise direction from the position shown in FIG. 3. Therefore, forces applied to blade 176 cause surface 222 to urge against cam pin 198, and cam pin 198 causes drive pin 196 to urge in the direction shown by arrow 234 against plate 230, thereby effectively preventing motion of blade 176 in the direction shown by arrow 226. Thus, blade 176 is locked in the "on" position by cooperation between bail arm cam 182, cam pin 198, operating cam 187, drive pin 196, and plate 230.

It is advantageous to lock blade 176 in the "on" position as shown in FIG. 3 by the above mentioned cooperation of parts in order to prevent electromagnetic forces generated under short circuit conditions from blowing blades 176 of isolation switch 120 open.

Toggle spring 188 pivots about pin 189.

Figure 4:
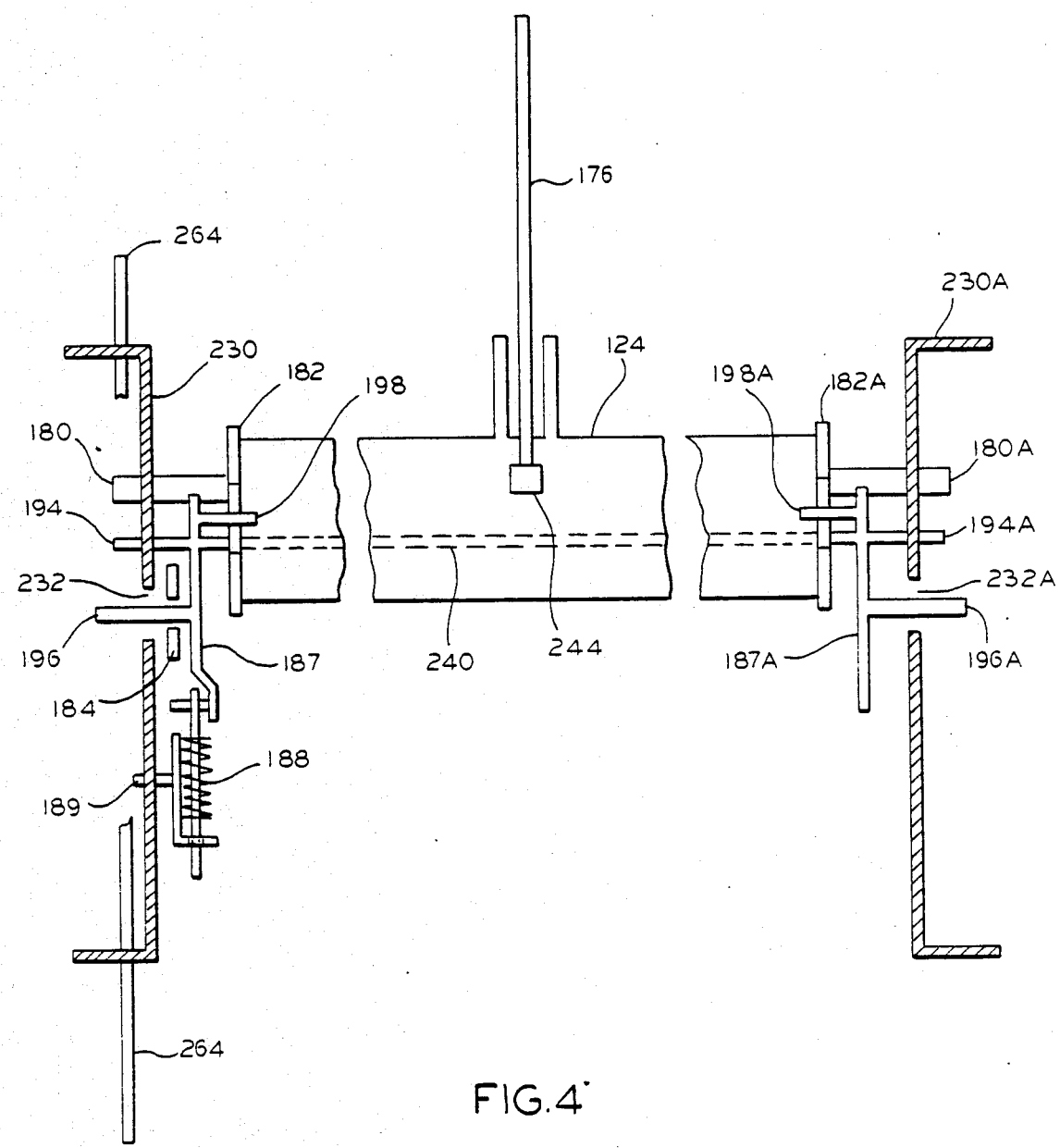
FIG. 4 is a sectional view of an isolation switch operating mechanism as seen in sectional arrows 4 in FIG. 3.
Figure 5:
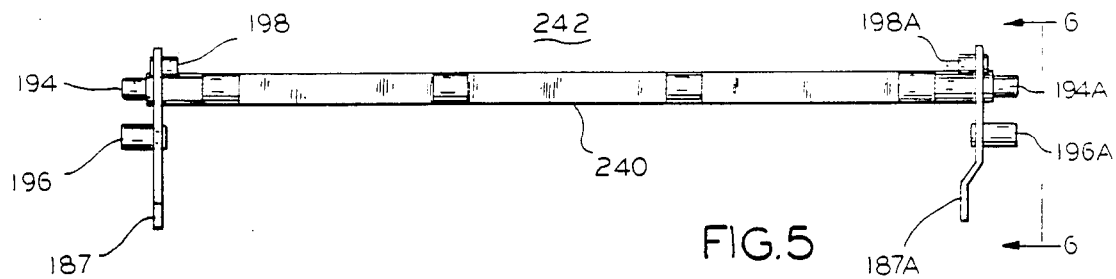
FIG. 5 is a top view of a cam and axle assembly.
Figure 6:
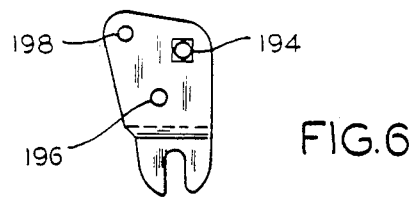
FIG. 6 is an end view of a cam and axle assembly.
Figure 7:
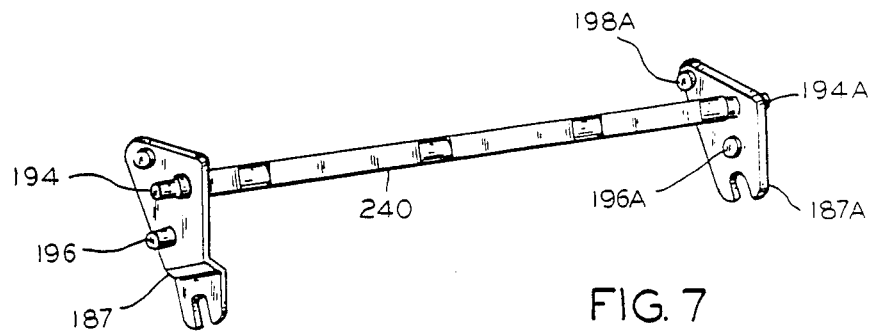
FIG. 7 is a perspective view of a cam and axle assembly.
Figure 9:
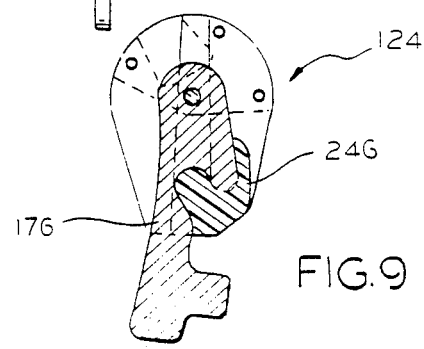
FIG. 9 is a cross sectional view of a bail arm, taken along section 9 as shown in FIG. 8.
Figure 16:
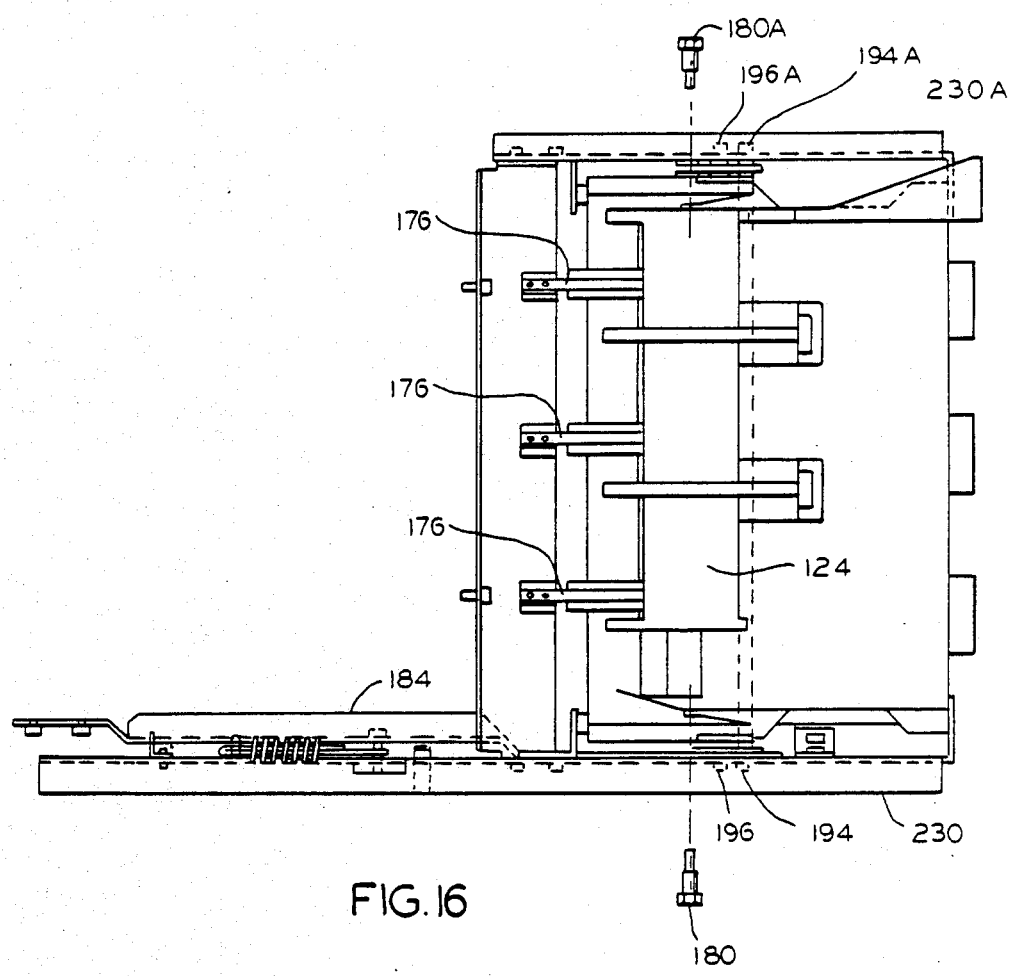
FIG. 16 is a top view of an isolation switch and operating mechanism.
Figure 17:
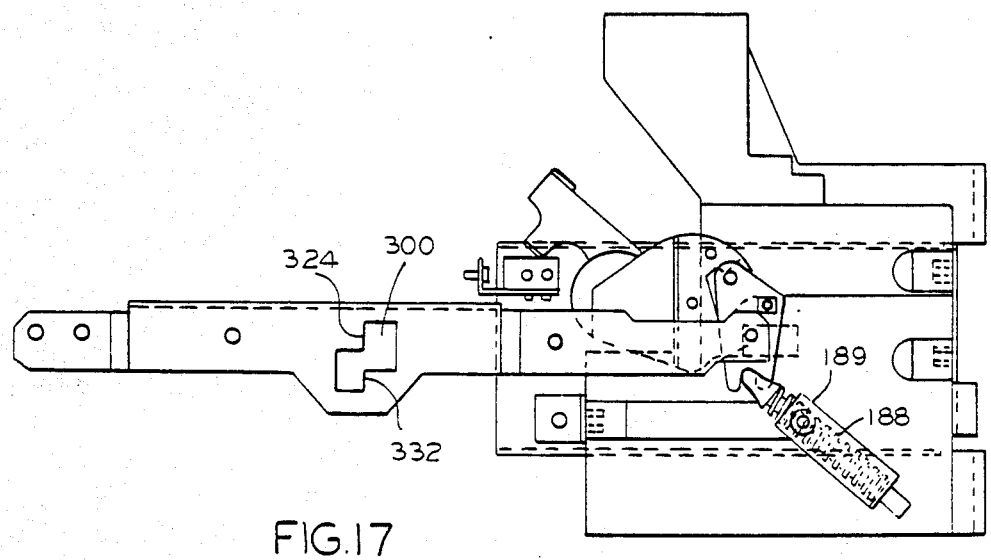
FIG. 17 is a side view of an isolation switch and operating mechanism.

FIG. 4 shows an end view of the bail arm and operating apparatus as shown by the arrows labeled 4 in FIG. 3. Bail arm 124 rotates about axle 180, and axle 180 rotates in a machined hole in plate 230. Bail arm 124 is shown as having axle 180 on the left and axle 180a on the right. Correspondingly, axle 180a rotates in a machined hole in plate 230a. Axles 180 and 180a are shown in top view in FIG. 16. Operating cam 187 and operating cam 187a are assembled on the axle 240 as is shown in greater detail in FIGS. 5, 6, and 7. The structure shown in FIGS. 5, 6 and 7 is referred to as assembled axle 242. Assembled axle 232 is made up of operating axle 187, operating cam 187a, and axle 240. Pins 194, 196, and 198 are assembled into operating cam 187. Pins 194a, 196a, and 198a, are assembled into operating cam 187a. Pins 194 and 194A are the turned ends of shaft 240. Referring to FIG. 4, axle 240 rotates about pins 194 and 194a, which fit into machined holes in plates 230 and 230a respectively. Link 184a urges rotation of operating cams 187 and 187a about axle 240. Motion of link 184 in the direction shown by arrow 185b in FIG. 3 urges link 184 to rise out of the plane of the drawing of FIG. 4, and further urges rotation of operating cams 187, 187a in the counterclockwise direction as shown in FIG. 3. Motion of link 184 in the direction shown by arrow 185a moves link 184 as shown in FIG. 4 below the plane of the drawing, and further urges clockwise rotation of operating cams 187, 187a. Pins 198, 198a engage bail arm cams 182, 182a respectively, and urge rotation of bail arm 124 bout axles 180, 180a. Rotation of bail arm 124 urges rotation of switch blade 176 about pivots 244, which are in line with pivots 180, 180A as shown in FIG. 16. In FIG. 4, bail arm 124 is shown in breakaway in two points. In FIG. 16, in top view, there are shown three switch blades 176 as operated by bail arm 124 as shown in FIG. 3 and FIG. 9. All of the switch blades 176 pivot about a line that is in alignment with axle 180 and axle 180a as shown in FIG. 4. Switch blade 176 has surface 246 which interlocks with a cross section of bail arm 124. Surface 246 captures switch blade 176 to bail arm 124 so that counterclockwise rotation of bail arm 124 about axles 180, 180a applies force to switchblade 176 thereby urging it to move in the direction shown by arrow 226.

Opening 232, as shown in FIG. 14 in plate 230, limits the angle of rotation that axle 240 can undergo. A corresponding opening 232a in plate 230a interacts with pin 196a to correspondingly limit the angle of rotation of axle 240. Electromagnetic forces generated during short circuit conditions and tending to blow switch blades 176 in the direction shown by arrow 226 in FIG. 3 are transmitted through operating cam 187, 187a to plates 230, 230a by pins 196 and 196a. Thus, pins 196, 196a, operating cams 187, 187a, surface 222 of bail arm cam 182, and a surface corresponding to surface 222 of bail arm cam 182a interacting with cam pins 198, 198a lock switch blade 176 in the closed position.

Figure 8:
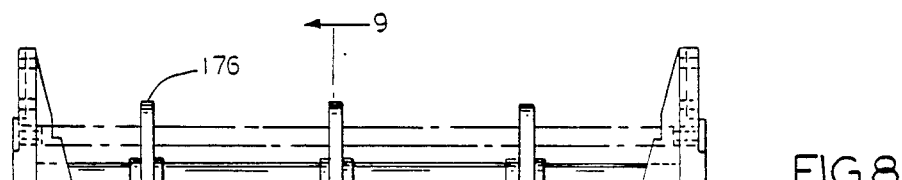
FIG. 8 is a top view of a bail arm.
Figure 10:
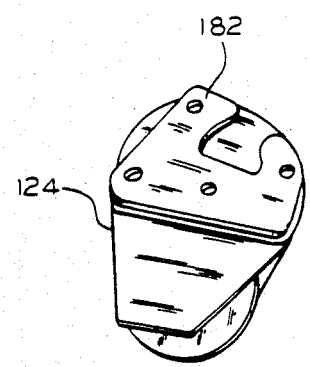
FIG. 10 is a detailed view of a bail arm and cam assembly.
Figure 11:
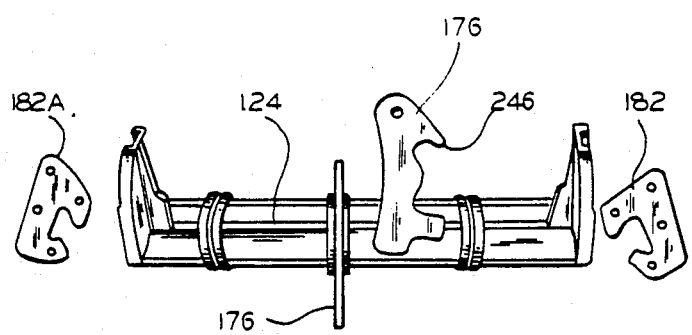
FIG. 11 is a detailed view of a bail arm, cam, and switch blade assembly.

FIG. 8 shows bail arm 124. FIG. 9 shows a cross section of bail arm 124. Surface 246 of switch blade 176 is shown in FIG. 9 in cooperation with the molded cross section of bail arm 124. For example, bail arm 124 may be made of glass reinforced polyester and produced in a plastic molding process. Switch blade 176 may be, for example, made out of sheet copper. FIG. 10 and FIG. 11 show more details of bail arm 124, cam 182 and cam 182a of bail arm 124, switch blade 176, and the assembly of the cams 182, 182a and switch blade 177 onto bail arm 124.

Figure 12:
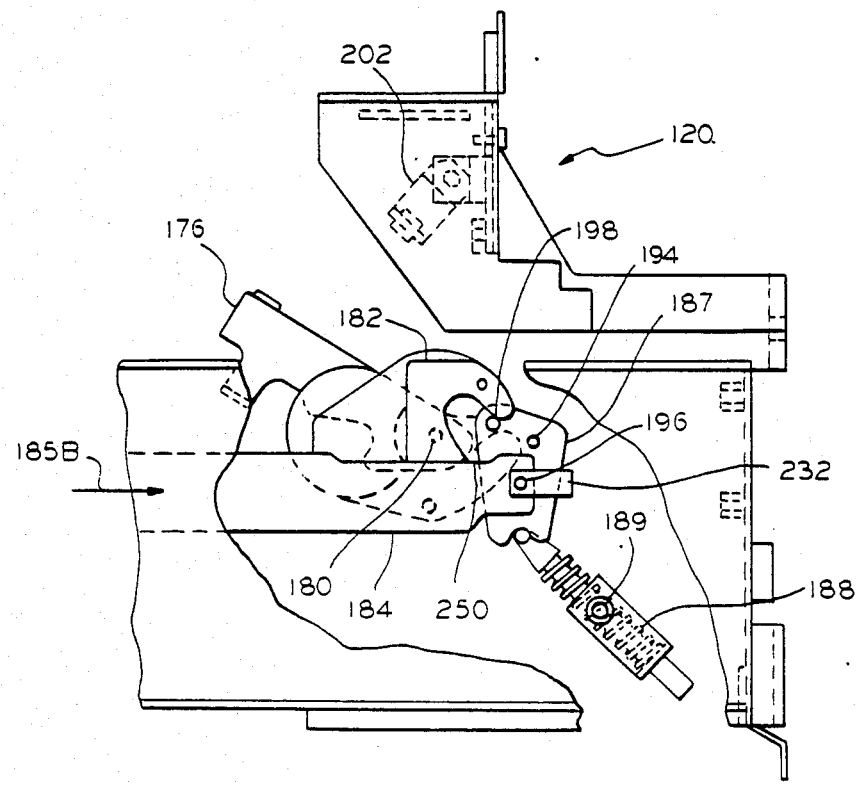
FIG. 12 is a detailed breakaway side view of an isolation switch operating mechanism.

FIG. 12 shows isolation switch 120 in the open position. Switch blades 176 are disconnected from stationary contact 202. Isolation switch 120 is operated into the closed position, as shown in FIG. 3, by motion of link 184 in the direction shown by arrow 185b. Closure of switch 120 is accomplished in the following manner. Link 184 urges pin 196 in the direction shown by arrow 185b. The motion of pin 196 in direction 185b urges counterclockwise rotation of operating cam 187 about axle 194. Counterclockwise rotation of operating cam 187 brings pin 198 into contact with surface 222 of bail arm cam 182. Pin 198 then urges clockwise rotation of bail arm cam 182 about axle 180. Also, rotation of operating cam 187 in the counterclockwise direction compresses toggle spring 188. When toggle spring 188 reaches its maximum compression, then the force exerted by toggle spring 188 on operating cam 187 shifts so as to tend to urge counterclockwise rotation of operating cam 187, and therefore to cause operating cam 187 to rotate rapidly into the closed position as shown in FIG. 3.

Rotation of operating cam 187 about pin 194 is limited to an angular range of, for example, 83 degrees, by pin 196 cooperating with opening 232 as shown in FIG. 14. Opening 232 is shown in FIG. 12, even though plate 230 is removed in the breakaway part of the drawing. Operating cam 187 moves into the position as shown in FIG. 3 under the influence of toggle spring 188.

Toggle spring 188 therefore produces a rapid snap action closing of switch blades 176 into stationary contacts 202. This rapid closing minimizes electrical arcing when closure of isolation switch 120 connects electric current into a load. A minimal load supplying a control circuit transformer is always present and may burn the contacts if the switch is opened or closed too slowly.

Opening of isolation switch 120 from the position shown in FIG. 3 to the position shown in FIG. 12 is accomplished by moving link 184 in the direction indicated by arrow 185a. Motion of link 184 urges clockwise rotation of operating cam 187 about pin 194 thereby bringing cam pin 198 into contact with surface 222 of bail arm cam 182 and thereby urging rotation of bail arm 124 in the counterclockwise direction about pin 180. After toggle spring 188 reaches its maximum compression, it snaps into the position shown in FIG. 12 thereby rapidly driving switch blade 176 out of contact with stationary contact 202. This rapid toggle action of toggle spring 188 minimizes the time that electric arc buildup can occur between switchblade 176 and stationary contact 202 under conditions wherein switch 120 is operated so as to interrupt an electric load.

Under normal operating conditions of controller 100, isolation switch 120 is not used to interrupt an electric load other than the control circuit. Contactor 150 is normally used to "interrupt" or to "make" electric circuit to a load. Isolation switch 120 is normally used to simply isolate all downstream electrical components from the voltage brought into controller 100 by bus conductors 110a, 110b, 110c. Normally isolation switch 120 only interrupts current to a control transformer taken through control transformer fuse links 139.

An interlock mechanism is provided to prevent operation of isolation switch 120 when the contacts of contactor 150 are closed, thereby preventing isolation switch 150 from interrupting or closing an electric current to a load.

Figure 13:
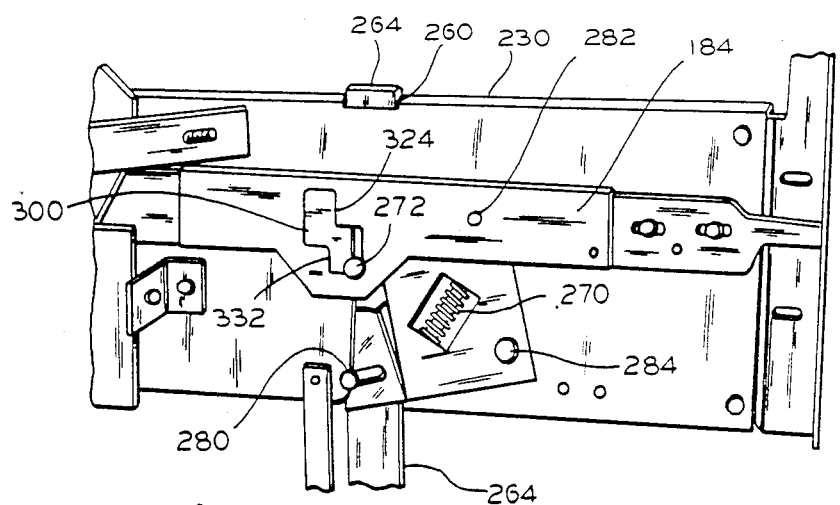
FIG. 13 is a perspective view of an isolation switch operating mechanism.
Figure 15:
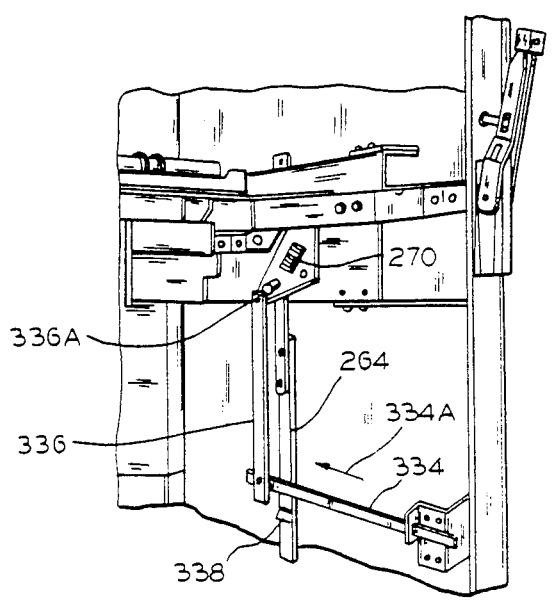
FIG. 15 is a perspective view of an isolation switch operating mechanism.
Figure 18:
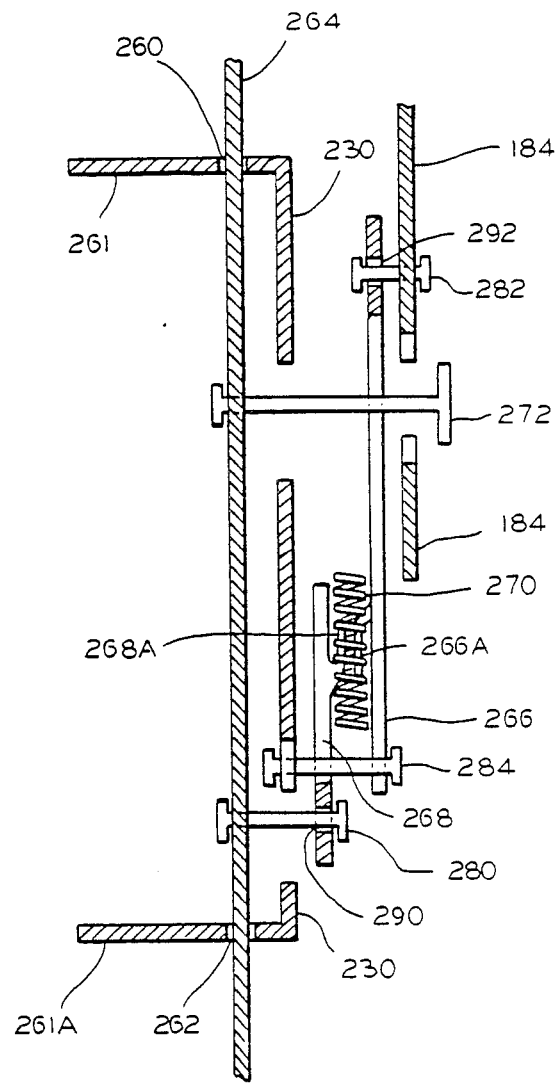
FIG. 18 is a sectional view taken along sectional arrow 18 as shown in FIG. 3 and shows details of an interlock mechanism.

Details of the interlock mechanism are shown in FIG. 3, FIG. 13, FIG. 15, FIG. 16, FIG. 17 and in FIG. 18. FIG. 18 is a section view taken through the section shown by arrows 18 in FIG. 3. Referring to FIGS. 13, 15, and 18, details of the interlock mechanism are shown. Plate 230 supports interlock link 264. Interlock link 264 passes through slots 260 and 262 formed in extensions 261 and 261a of plate 230. Interlock link 264 moves vertically in slots 260, 262. First crank 266 and second crank 268 are pivoted about pivot pin 284. Pivot pin 284 may be, for example, riveted into plate 230. Crank spring 270 connects first crank 266 and second crank 268 by slipping onto projections 266a and 268a of first crank 266 and second crank 268 respectively. Rotation in either direction of cranks 266 and 268 relative to each other about pivot pin 284 tends to compress crank spring 270. Vertical crank pin 280 is, for example, riveted into interlock link 264. Groove 290 in second crank 268 slides over vertical crank pin 280. Groove 292 in first crank 266 slides over horizontal crank pin 282. Thus, motion of link 184 in either the direction of arrow 185a or arrow 185b moves horizontal crank pin 282 either above the plane of FIG. 18 or below the plane of FIG. 18, thereby causing rotation of first crank 266 about pivot pin 284, and thereby compresses crank spring 270. Compression of crank spring 270 causes rotation of second crank 28 about pivot pin 284 and therefore causes the surface of groove 290 to bear against vertical crank pin 280 and urge vertical motion of interlock link 264. The maximum force that can be transmitted to interlock link 264 in the vertical direction by means of horizontal motion of link 184 is limited by the compressional force exerted by crank spring 270 between first crank 266 and second crank 268.

The limitation of vertical force that can be exerted on interlock link 264 is important in protecting contactor 150 from breakage should excessive force be applied to link 184 in urging it to move in either direction shown by arrow 185a or arrow 185b.

Figures 19, 20:
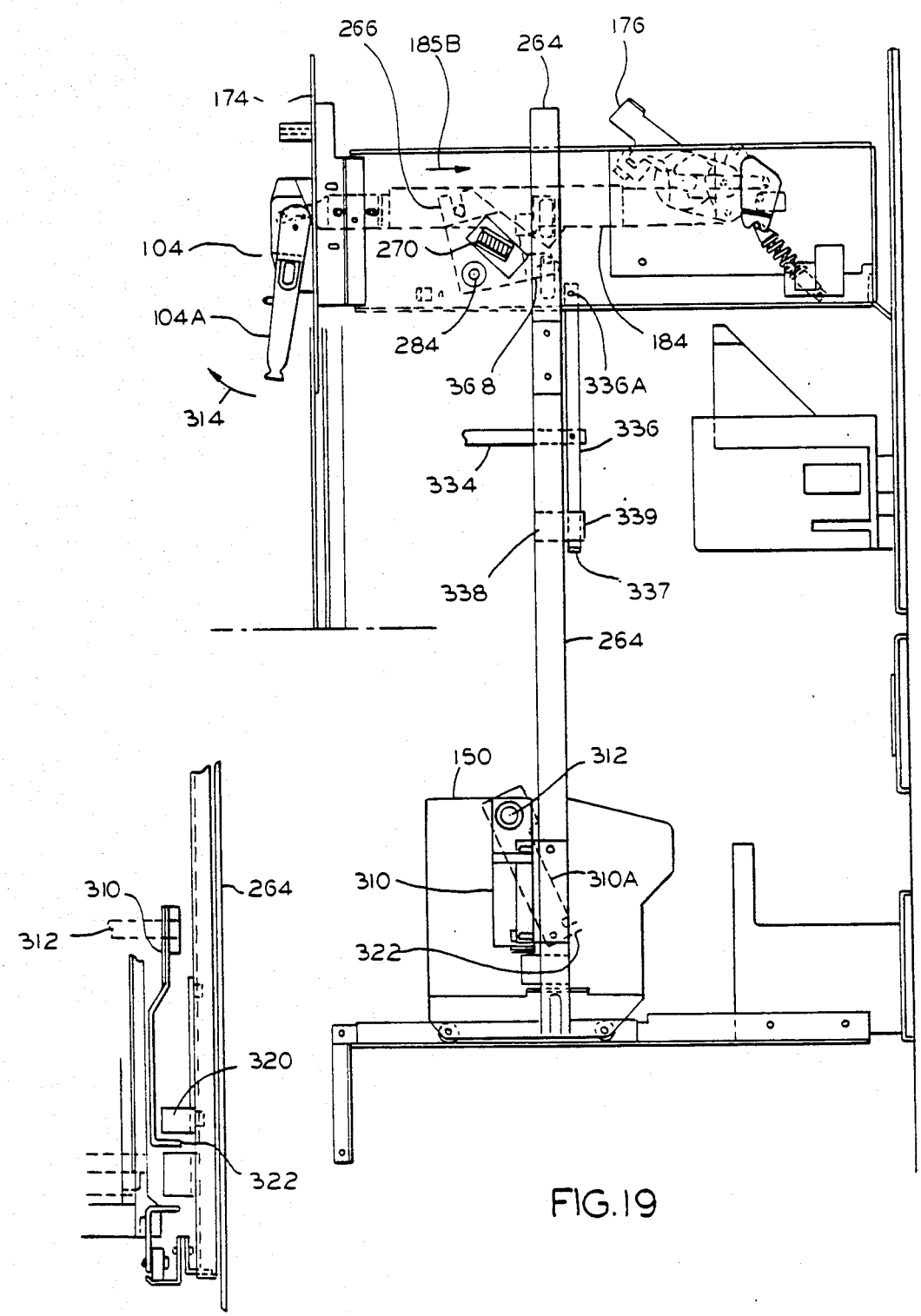
FIG. 19, FIG. 20, FIG. 21, FIG. 22, FIG. 23, and FIG. 24 are detailed views of an interlock mechanism.

The cooperation of interference pin 272, which is riveted into interlock link 264, with the double rectangular opening 300 in link 184, as shown in detail in FIG. 13, provides a mechanism for preventing operation of isolation switch 120 when contactor 150 is in the closed position. FIG. 19 and FIG. 20 show cooperation of interlock link 264 and flag 310 of contactor 150.

Figure 21:
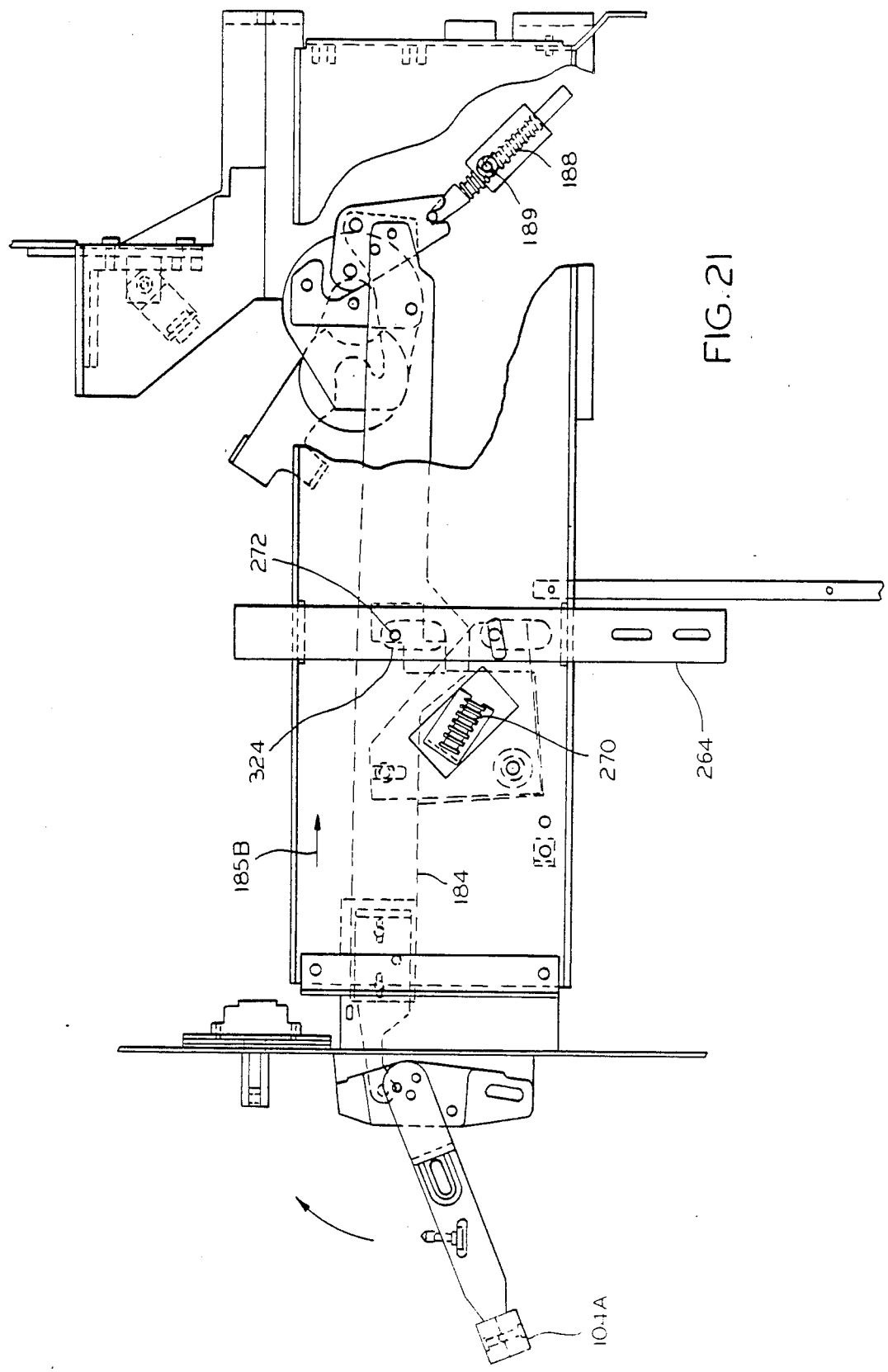

Flag 310 is rigidly attached to armature axle 312 of contactor 150. When contactor 150 is in the open position, flag 310 takes a position as shown by dotted line 310a in FIG. 19. When contactor 150 has its contacts in the closed position, flag 310 is in the position as shown by solid lines 310 in FIG. 19. FIG. 19 shows isolation switch 120 (not shown in FIG. 19) in the open position. Switch blade 176 is shown in FIG. 19 in the open position. An attempt to close isolation switch 176 by moving hand lever 104a of handle 104 in the direction shown by arrow 314 is prevented by cooperation between flag 310 and interlock link 264. Motion of hand lever 104a in the direction shown by arrow 314 urges link 184 to move in the direction shown by arrow 185b. Motion of link 184 in the direction shown by arrow 185b has two effects, the first is to cause closure of switchblades 176, and the second effect is to cause clockwise rotation of first crank 266 and second crank 268 about pivot pin 284. Motion of first crank 268 in the clockwise direction tends to move interlock link 264 downwardly. However, when flag 310 is in the position shown for a closed contactor then tab 320, attached rigidly to interlock link 264, catches against projection 322 of flag 310. The catching of tab 320 against projection 322 prevents interlock link 264 from moving downwardly. Referring to FIG. 21, interference pin 272 then catches against surface 324 of double rectangular opening 300. FIG. 21 shows interference pin 272 engaged against surface 324, thereby preventing further motion of link 184 in the direction shown by arrow 185b. Thus, the engagement of tab 320 against projection 322 of flag 310 prevents closure of isolation switch 120 by means of interference pin 272 engaging against surface 32, thereby directly preventing motion of link 184 in the direction shown by arrow 185b.

Figures 22, 23:
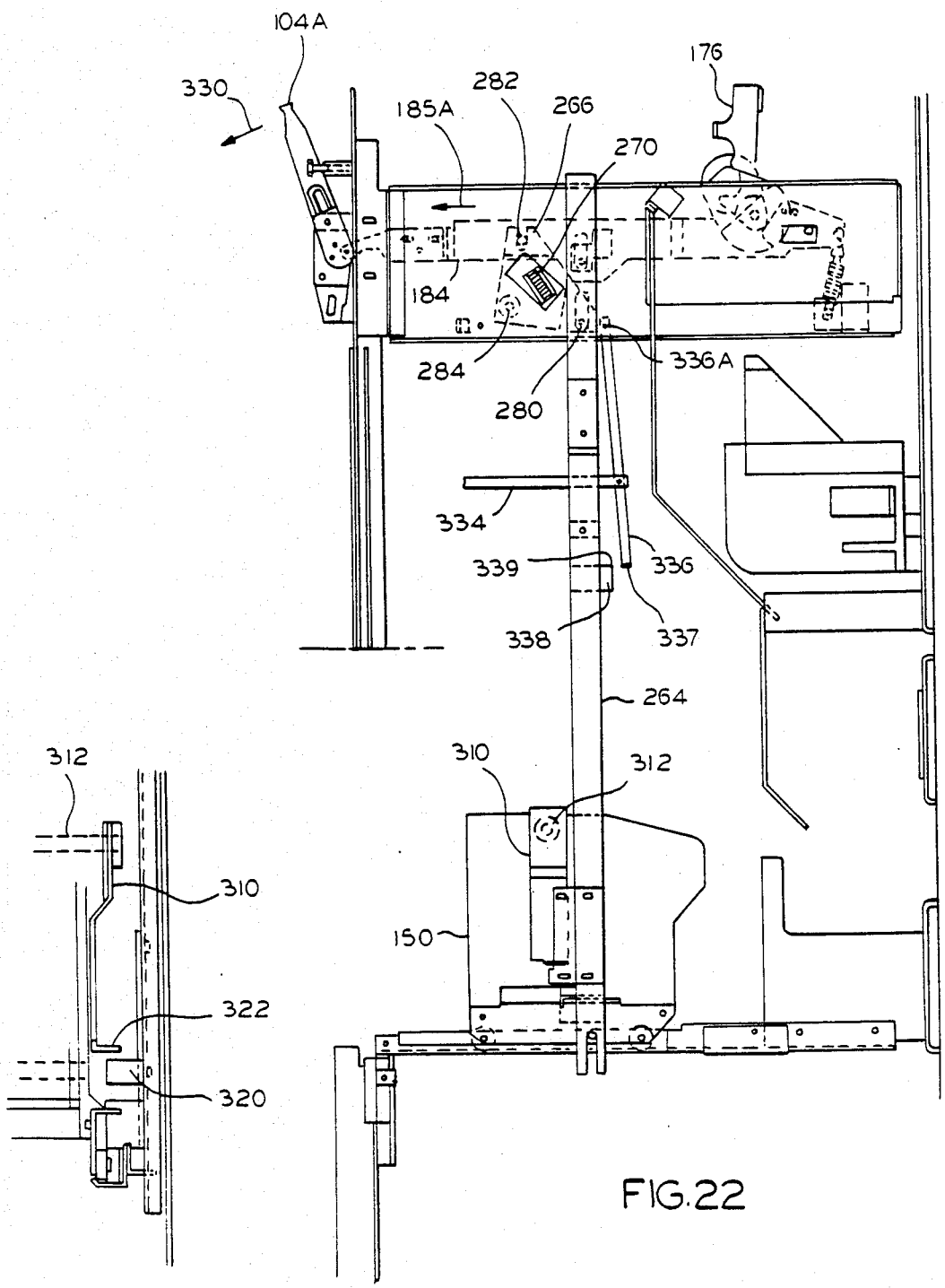
Figure 24:
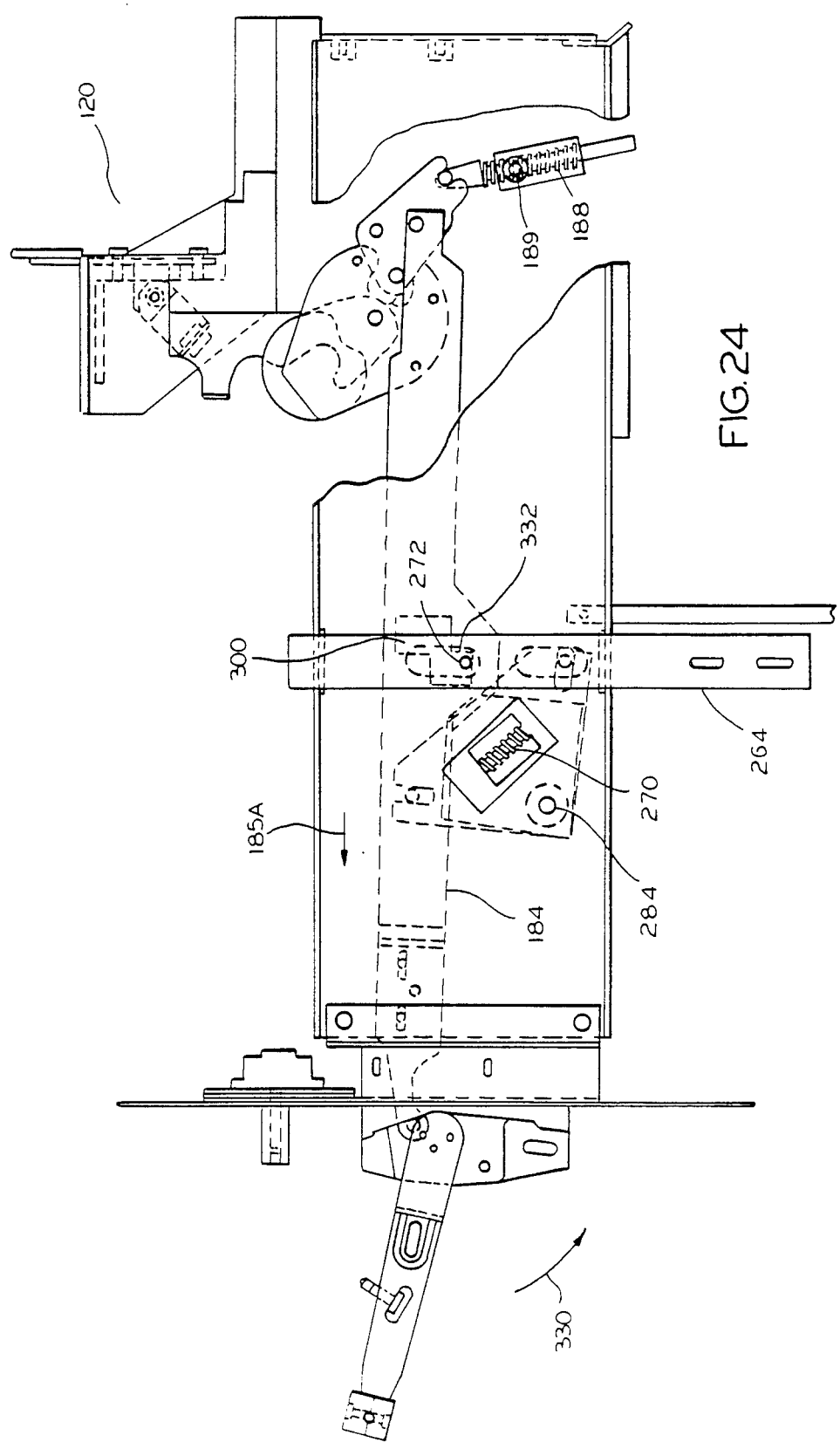

Operation of the interlock mechanism to prevent opening of isolation switch 120 when contactor 150 is closed is shown in FIG. 22, FIG. 23, and FIG. 24. When switch blades 176 are in the closed position, as shown in FIG. 22, interlock link 264 is moved downwardly so that tab 320 is beneath projection 322 of flag 310. An attempt to open isolation switch 120 by moving switchblades 176 into the open position is illustrated by arrow 330 showing motion of hand lever 104a. Motion of hand lever 104a in the direction shown by arrow 330 urges link 184 to move in the direction by arrow 185a. Motion of link 184 in the direction shown by arrow 185a causes rotation of first crank 266 and second crank 268 in the counterclockwise direction about pivot pin 284. Under counterclockwise urging, second crank 268 urges interlock link 264 to move in the vertical direction upwardly. Upward motion of interlock link 264 is prevented by tab 320 catching underneath projection 322 of flag 310. Prevention of interlock link 264 from moving vertically upward by tab 320 catching beneath projection 322 of flag 310 causes interference pin 272 to matingly engage surface 332 of double rectangular cutout 300. Engagement of surface 332 against interference pin 272 prevents further motion of link 184 in the direction shown by arrow 185a, thereby directly preventing opening of isolation switch 120.

The force limiting function of first crank 266, second crank 268, and crank spring 270 as they pivot about pivot pin 284 limits the force that can be exerted against contactor 150 through contactor flag 310. The maximum force that can be exerted against projection 322 by interlock link 264 is limited by the compression force exerted by crank spring 270. This force limiting feature of crank spring 270 is important to prevent excessive force being exerted against contactor 150 by excessive force exerted by an individual operator against hand lever 104a. It is not unusual for an operator to exert excessive force against a hand lever such as hand lever 104a. Without the intermediate spring mechanism such as crank spring 270 to limit the force transmitted to the contactor, it is possible for an operator to overforce hand lever 104a and break the structure of contactor 150.

FIG. 25 is a top view of a molding 340 for an isolation switch.

FIG. 26 is a front view of molding 340, and FIG. 27 is a side view of molding 340. For example, molding 340 may be made of glass reinforced polyester. Mounting holes 342, 342a, 344 344a, and 346, 346a provide a means for attaching stationary contacts 202 to the isolation switch molding 340. Mounting holes 350 provide a means for attaching pivot 244, as shown in FIG. 4, for switch blades 176. Barriers 352 and end plates 354 provide compartment isolation for the three phases of a three phase AC circuit. Mounting holes 356 provide a means for attaching upper fuse clips to isolation switch molding 340 for the line side of power fuses 132, as shown FIG. 2.

Figures 28, 29:
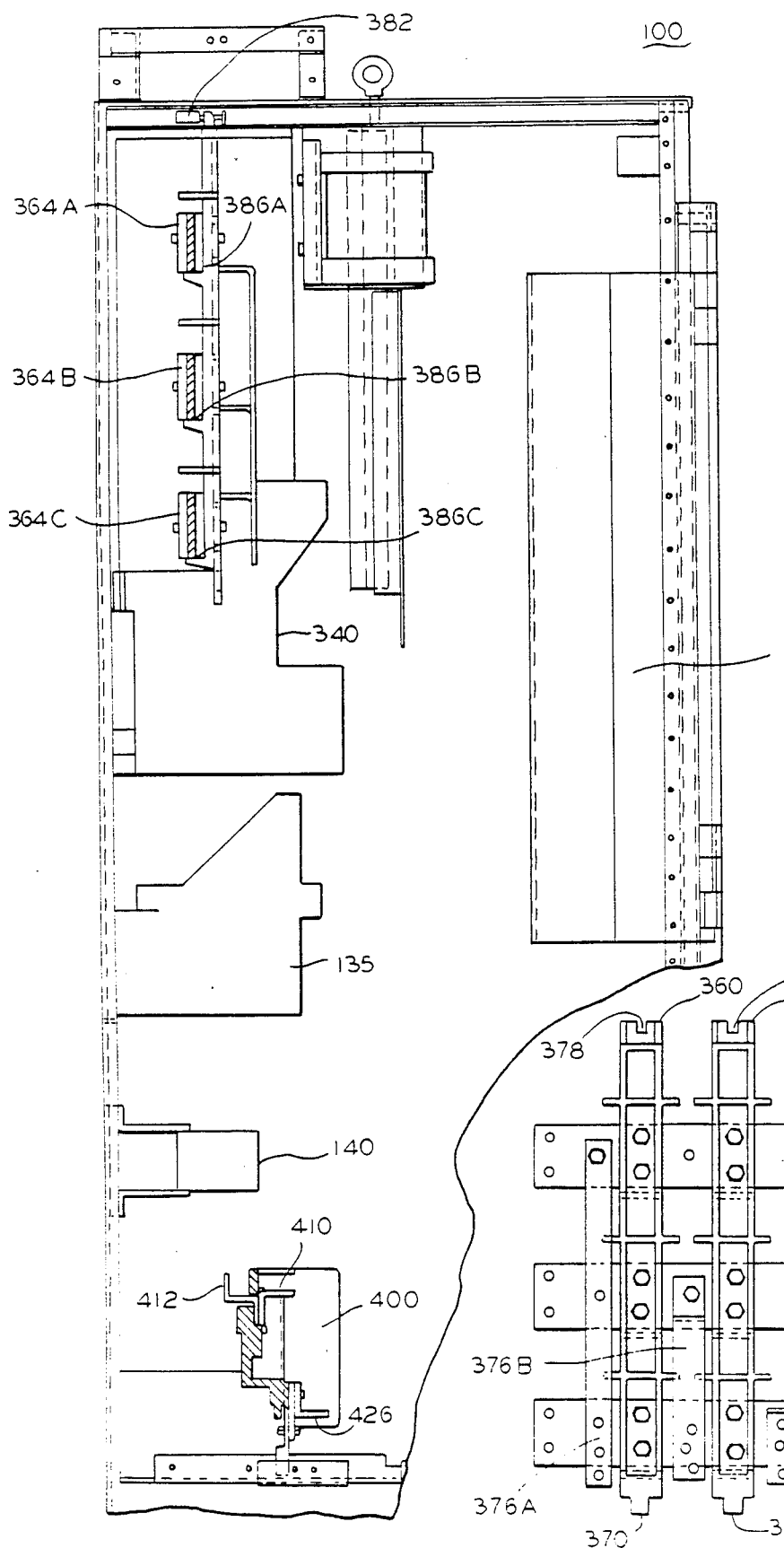
FIG. 28 is a front view of a bus bar assembly.
FIG. 29 is a side view of a bus bar assembly installed in a controller.
Figure 31:
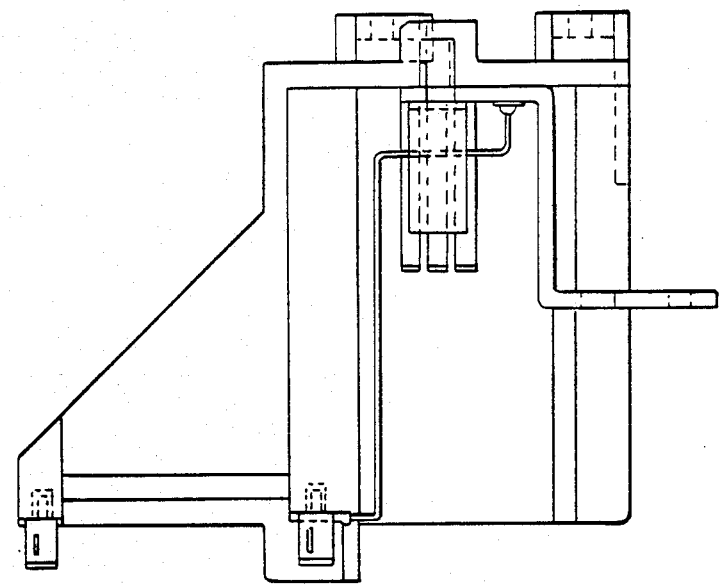
FIG. 31 is a side view of a lower fuse clip holder for a controller.

FIG. 28 is a front view showing a bus bar assembly. Support 360 and support 362 may be made of glass filled molded polyester. Supports 360, 362 support bus bars 364a, 364b and 364c. As shown in FIG. 29, bus bars 364A, 364B, 364C may be doubled to increase current carrying capacity. Bus bar 364a may connect for example to bus bar 110a as shown in FIG. 1 and correspondingly bus bar 364b may connect to bus bar 110b, and bus bar 264c may connect to bus bar 110c. Tab 370 of support 360 and tab 372 of support 362 fit into sockets 370a and 372a respectively, and socket 370a and 372a are shown in the top view of isolation switch molding, FIG. 25. Bus connectors 376a, 376b, and 376c connect bus conductors 364a, 364b, 364c, respectively, to the stationary contacts 202 which are mounted in mounting holes 342 342a, 344 344a, and 346 346a as shown in FIG. 26. Recess 378 in support 360 and recess 380 in support 362 attach by bolts to an angle iron 382 running across the top of controller 100.

Bus conductors 364a, 364b, and 364c, sit on molded shelves 386a, 386b, and 386c as shown in FIG. 29. The molded shelves 386a, 386b, and 386c, molded into supports 360 and 362, and the supports 360, 362 mounted into sockets of contactor molding 340 provide a dimensional stability for the bus conductors. The fitting of supports 360, 362 into sockets in isolation switch molding 340, and the attachment of supports 360, 362 to the housing of controller 100 by bolts through recesses 378 and 380 fix the location of the supports 360, 362. The support by shelves 386a, 386b, 386c of bus conductors 364a, 364b and 364c provides a stable mounting arrangement for the bus conductors.

Figure 30:
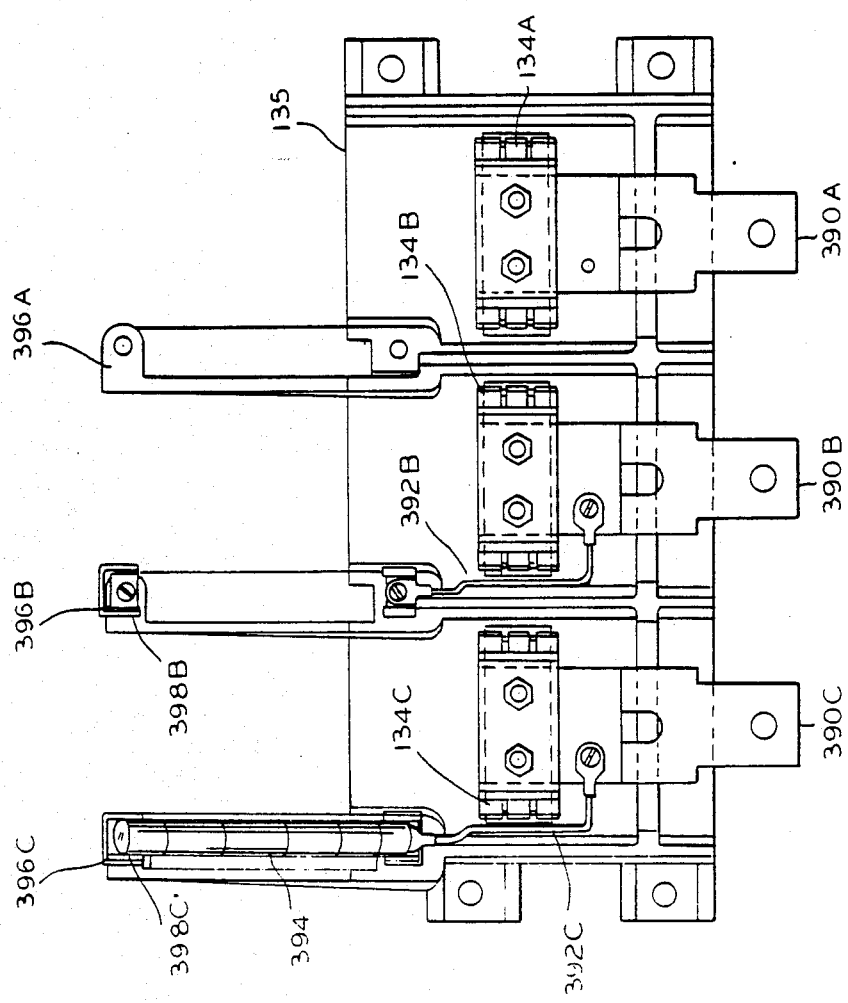
FIG. 30 is a front view.

FIG. 30 shows a front view of a molding 135 for lower power fuse clip 134a, 134b, 134c as shown in FIG. 2. Conductors 390a, 390b, 390c provide a means for connecting a load downstream from the power fuses. Conductors 392b and 392c are shown, and provide a means for connecting instrument fuses to the load side of the power fuses. Projections 396A, 396B, 396C provide a support for instrument fuses and connecting hardware. One instrument fuse 394 is shown in place. Conductors connect, for example, an instrument transformer, to the load side of instrument fuse clips 398b and 398c. No fuse clip nor conductor 392 is shown connected to lower power fuse clip 134a, only the mounting holes for the control fuse clips are shown.

FIG. 32 shows molding 400. Molding 400 serves as a receptacle for attaching contactors into controller 100. In FIG. 2, contactor 150 blocks the view of molding 400. Molding 400 appears in FIG. 29. Referring to FIG. 32, tab 402 provide a means for attaching molding 400 into controller 100. Tabs 402 are also shown in FIG. 33. Holes 404 provide a means for attaching conducting stabs to molding 404. FIG. 32A(a) is a cross section of molding 400 taken along sectional lines 32A, as shown in FIG. 32.

Metal insert 406 is located in hole 404. Bolt 408 screws into metal insert 406. Stab 410 provides a plug in connection for the line side of a contactor such as contactor 150. Connector 412 provides a cable connection to the load side of the power fuse clips. Hole 414 receives a bolt to attach a cable to connector 412. Bolt 408 holds stab 410 and connector 412 in electrical contact and attaches them to molding 400. Bolt 420 screws into metal insert 422 located in hole 424. Holes 424 provide a means for attaching stabs for making the load side connection with a contactor such as contactor 150. Stab 426 provides the load side connection to contactor 150. Connector 428 provides a means for attaching a load cable.

Molding 400 may alternatively be used as a junction box between load cables coming from contactor 150 and joining with a customer's cables. FIG. 32(92) is a cross sectional view of molding 400 taken along section lines 32A as shown in FIG. 32. A cut-out for penetration of connector 414 is absent from the alternative embodiment of molding 400 as shown in FIG. 32A(2). Box 430 as shown in FIG. 2 is a typical location for a customer junction box made from molding 400 in the alternative embodiment shown in FIG. 32A(2). Connector 432 provides a connection to load cables coming from contactor 150, and shown as cables 158A, 158B, 158C in FIG. 2. Connector 434 and connector 436 provide a convenient means for a customer to connect load cables to controller 100. Bolt 438 holds connector 432 in electrical contact with connector 434, and also attaches the two connectors to molding 400 by screwing into a metal insert in hole 440. Bolt 442 attaches connectors 434 and 436 to molding 400 in hole 424. A customer may connect cables to connector 436 by means of bolting them through a hole in connector 436. When molding 400 is used as a customer junction box a lid 444 is attached thereto as shown in FIG. 32A(2). Lid 444 snaps into plastic projections 445. Molding 400 may be made of a glass-filled polyester and produced in a molding process.

A door interlock mechanism is illustrated in FIG. 15, FIG. 19 and FIG. 22. Door push rod 334 as shown in FIG. 15 is depressed in the direction of arrow 334a when the door is closed. Door interlock lever 36 pivots about rivet 336a. FIG. 19 shows the switchblades 176 of isolation switch 120 in the open position. Also, door push rod 334 is in a position indicating that the door is open. Door push rod 334 is spring loaded to bring it into the position shown in FIG. 19 when the door is open.

Projection 337 of door interlock lever 336 is beneath the lower surface of tab 338. Tab 338 is, for example, riveted to interlock line 264. An attempt to close the isolation switch by bringing switch blades 176 into the vertical closed position is accomplished by moving hand lever 104a in the direction shown by arrow 314. Moving hand lever 104a in a direction shown by arrow 314 causes motion of link 184 in the direction shown by arrow 185b, and by crank action of first crank 266 and second crank 268 interlock link 264 is moved vertically in the down direction, causing the lower surface of tab 338 to catch against projection 337 of door interlock lever 336. Interference with the downward motion of interlock link 264 causes interference pin 272 to cooperate with surface 324 as shown in FIG. 21, and prevents link 184 from moving in the direction shown by arrow 185b. Therefore, the switch blades 176 cannot be moved into the closed position when the door is opened and door push rod 334 is in the position shown in FIG. 19.

In FIG. 22 there is illustrated switch blades 176 in the on position and the door open. Door push rod 334 is initially in the position shown in FIG. 19. As the switchblades are moved into the open position by motion of hand lever 104a in the direction shown by arrow 330, counterclockwise rotation of first crank 266 and second crank 268 is urged by pin 282 and vertical motion upward is urged of interlock link 264. The slopped surface 339 of tab 338 bears against and pushes away projection 227 of door interlock lever 336 permitting vertically upward motion of interlock link 264, thereby permitting opening of the isolation switch. Thus, the door interlock permits opening of isolation switch 120 when the door is open. However, the door interlock mechanism prevents closing the isolation switch when the door is open.

Figure 34:
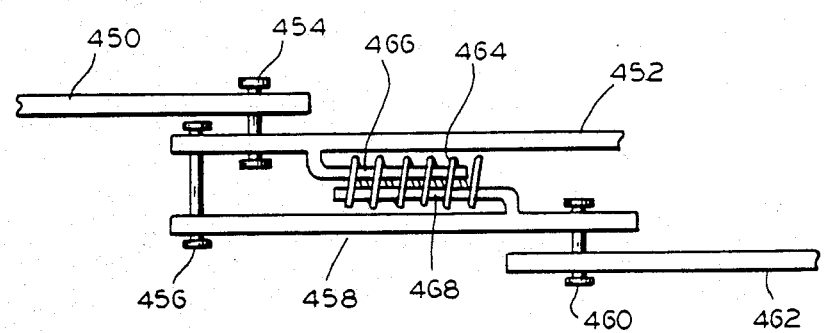
FIG. 34 is a top view of a force limiting linkage.
Figure 35:
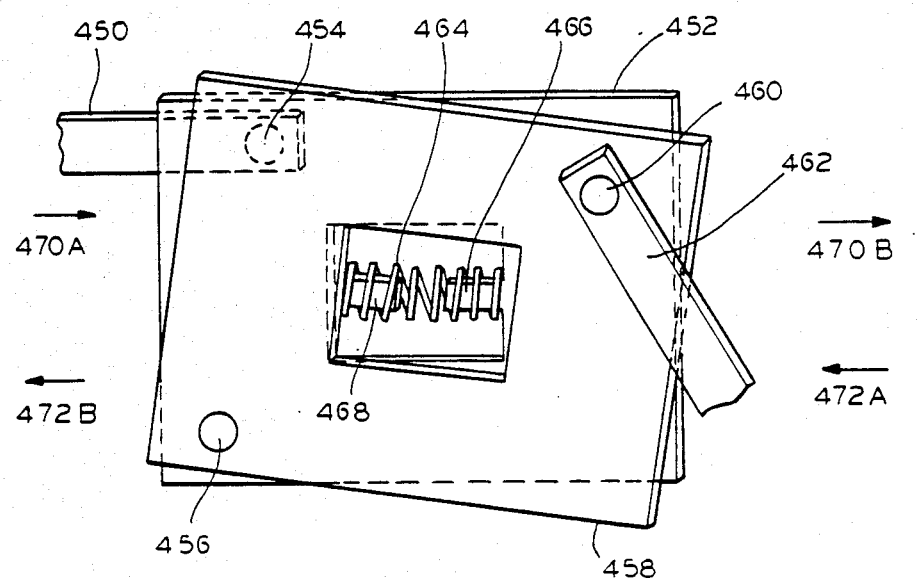
FIG. 35 is a side view of a force limiting linkage.
Figure 36C:
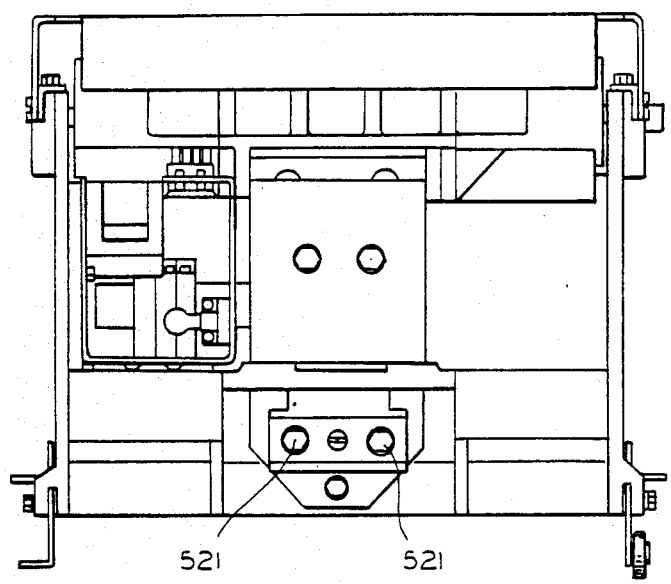
FIG. 36C is an end view of a vacuum break contactor.
Figure 36B:
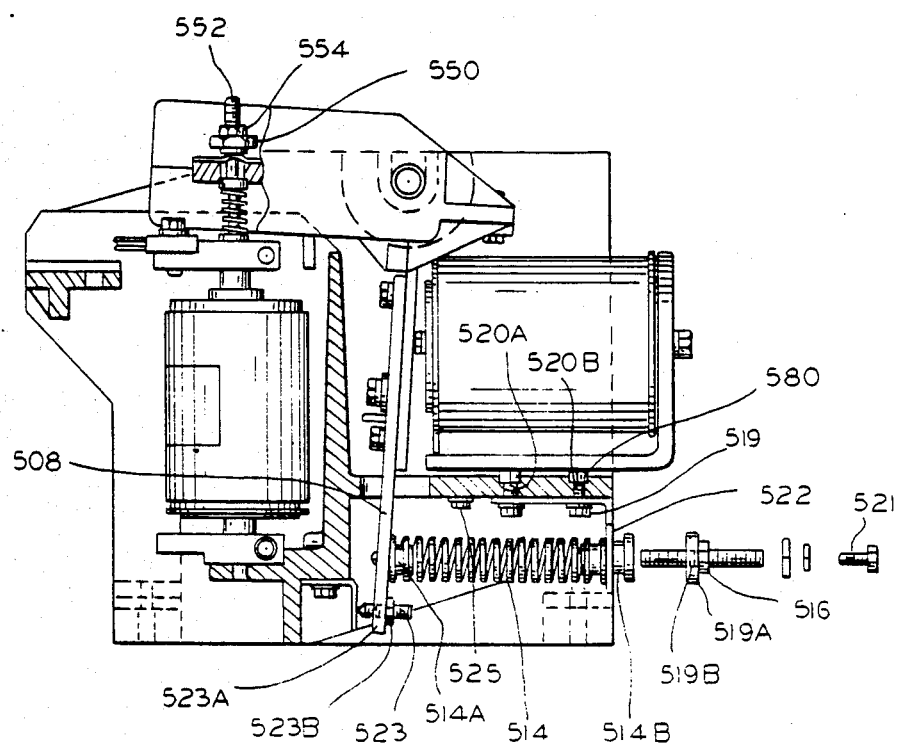

An alternative embodiment of a force limiting mechanical linkage is shown in FIG. 34 and 35. Link 450 is attached by pin 454 to plate 452. Pin 454 may be, for example, a rivet installed so that it acts as a pivot between link 450 and plate 452. Plate 452 is hinged to plate 458 by means of pin 456. Pin 456 may be, for example, a rivet installed so as to permit relative rotation between plates 452 and 458. Link 462 is rotatably attached to plate 458 by means of pin 460. Pin 460 may be, for example, a rivet.

Projection 466 is formed from part of plate 452. For example, plate 452 may be made in a stamping process, and projection 466 formed from the blank used to produce 452. Projection 468 is part of plate 458, and, for example, may be similarly formed in a stamping process from the blank used to form plate 458. Plates 452 and 458 may be, for example, formed from the same die and same stamping process. Plates 452 and 458 are then reversed relative to the orientation in the die and rotatably fastened by pin 456.

Spring 464 fits over projections 466 and 468. Spring 464 thereby couples plate 452 to plate 458.

Force in the direction shown by arrow 470a on link 450 causes compression of spring 464, and spring 464 urges rotation of plate 458 about pin 456. Rotation of plate 458 about pin 456 urges link 462 to move in the direction shown by arrow 470b. The maximum force that may be transmitted from link 450 to link 462 is the force of compression of spring 464. So long as a mechanical stop is utilized to prevent excessive travel of link 450 so as to compress spring 464 to the point that adjacent coils of spring 464 are in contact with each other, then the maximum force that can be transmitted from link 450 to link 462 is simply the compressional force exerted by spring 464.

Motion of link 462 in the direction shown by arrow 472a likewise causes compression of spring 464. The compression of spring 464 urges link 450 to move in the direction shown by arrow 472b. Thus, force may be transmitted by motion of link 462 in the direction shown by 472a to link 450. And the maximum force that may be transmitted from link 462 to link 450 is the compressional force exerted by spring 464. So long as a mechanical stop (not shown) is used to limit the distance link 462 is permitted to travel, then the maximum force that can be transmitted to link 450 is limited by the compressional forces exerted by spring 464. Although projections 466, 468 are shown offset in FIG. 34, they may lie in the plane of plates 452, 458 respectively. Plates 452, 458 will then rub against each other.

A mechanical linkage similar to that shown in FIG. 34 and FIG. 35 shown in FIG. 18, FIG. 3, FIG. 21, and FIG. 24 and other drawings. The linkage shown in FIG. 18 is used as a bell crank, for example, to transmit limited force from vertical motion to horizontal motion.

Figure 37:
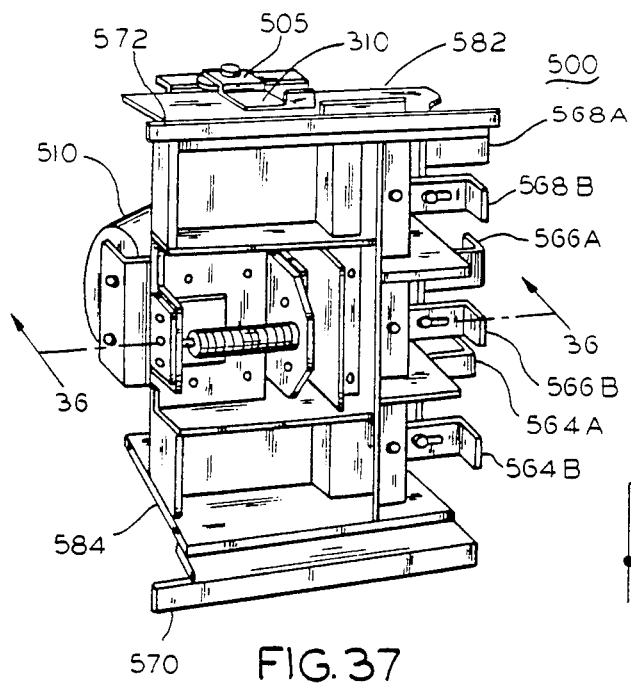
FIG. 37 is a bottom view of a vacuum break contactor.

FIGS. 36A, 36B, 36C and FIG. 37 show a vacuum break contactor 500. For example, vacuum break contactor 500 could be used for contactor 150 as shown in FIG. 2. FIG. 36 is a cross sectional view of a vacuum break contactor taken along section lines 36 as shown in FIG. 37. In contactor 500, armature 502 is hinged about axle 504. Arm 506 attaches rigidly to axle 504, and armature 502 is bolted to arm 506. Axle 504 rotates in bearings 505, as shown in FIG. 37.

Arm 508 is bolted to armature 502 and compresses spring 514 when armature 502 rotates in a clockwise directino about axle 504. Operating coil 510 produces a magnetic force which attracts soft iron armature 502 when coil 510 is energized by an electric current flow. Coil 510 is mounted to magnet frame 512.

Spring 514 provides force to return the armature after de-energization of the operating coil. Spring 514 fits onto guide 514A which is bolted to the armature 502. Stop 508A limits travel of arm 508 and armature 502. Spring 514 fits onto guide 514B. Guide 514B is held in place by bolt 518. Plate 519A is bolted to bracket 519 by bolts 521, and plate 519A has threaded hole 519B which accepts threads of bolt 518. Nut 516 locks bolt 518 into position on plate 519A. Hole 522 in bracket 519 is large enough to accept guide 514B. The force exerted by spring 514 on arm 508 may be adjusted by turning bolt 518 in order to achieve a desired compression of spring 514. Spring 514 may be removed from the apparatus through hole 522 first be relaxing compression on spring 514 and then removing plate 519A by removing bolts 521. Bracket 519 is held to support 580 by two bolts, 520A and 520B.

Arm 506 operates the contacts in vacuum bottle 528. Movable contact 530 is attached by threaded rod 552 to arm 506. Stationary contact 534 is attached by bolt 534A to surface 535 of support 580. When coil 510 is energized armature 502 is attracted to coil 510 by magnetic forces, compresses spring 514, and urges movable contact 530 into physical contact with stationary contact 534. Bellows 536 is flexible and moves as movable contact 530 moves. Bellows 536 maintains a vacuum within the interior 537 of vacuum bottle 528. When movable contact 530 comes into physical contact with stationary contact 534 an electrical circuit is made between line connector clamp 542, line connector arm 540, flexible conductor 538, movable contact 530, stationary contact 534, load connector arm 546, and load connector clamp 548. Line connector clamp 542 and load connector clamp 548 are electrically connected to appropriate terminals within a contactor receptacle box, for example, located in a controller enclosure.

Nuts 550, 554 screw on threaded rod 552. Nut 554 locks with nut 550 in order to maintain threaded rod 552 in a stable position on arm 506. Spring 532 provides overtravel between armature 502 an arm 506, and provides the appropriate contact force between movable contact 530 and stationary contact 534. Adjustment of nut 550 and nut 554 is done to obtain the appropriate contact closure force between movable contact 530 and stationary contact 534.

Bolt 523 screws into threaded hole 523A in arm 508 in order to provide an adjustable stop for armature 502. The adjustable stop allows vacuum bottles having different stroke lengths to be used in the contactor. Nut 523B locks bolt 523 into a desired position. Coordination between the setting of the stop by bolt 523 and the setting of nuts 550, 554 on threaded rod 552 sets the stroke length for vacuum bottle 528. This adjustable stop is an alternative to fixed stop 508A.

Spring 514 may be disassembled from contactor 500 without upsetting the adjustment of vacuum bottle 528. Adjustment bolt 518 and nut 516 and bolt 521 are accessible from the rear of contactor 500, and bolt 518 may be completely loosened from the outside of enclosure 102, as shown in FIG. 2, without removing contactor 500, or contactor 150 as it is shown in FIG. 2, from enclosure 102.

The operating coil 510 may be serviced, removed, or replaced in contactor 500 in enclosure 102, without disturbing the adjustment of the vacuum bottles as determined by nuts 550 and 554. Magnet frame 512 is held in place by four bolts 525. Two bolts are marked as 525 and two are hidden behind bolt 520B. The ability to service the operating coil of a vacuum bottle ocntactor without disturbing the adjustment of the vacuum bottles provides a great convenience for field service of a motor controller using such a contactor. Also control components 154 of contactor 150, or contactor 500, are mounted so as to be readily accessible through door 118 of enclosure 102, as shown in FIG. 2. Thus, the control components and the operating coil of vacuum breaker contactor 500 are readily accessible for service through open door 118 of enclosure 102 when contactor 500 is used for contactor 150 in controller 100.

Contactor 500 may be mounted on wheels 560, 562. Contactor 150 as shown in FIG. 2 is mounted on wheels 166a and 166b. Wheels 166a and 166b run on rails 164a, 164b. Contactor 500, when used as contactor 150, runs on wheels 560, 562 on rails 164a, 164b.

An alternative embodiment of the electrical connection arrangement of contactor 500 is shown in FIG. 37. Instead of clamps 542 and 548 for use in quickly connecting and disconnecting contactor 500 from a receptacle box, the alternative embodiment shown in FIG. 37 has bolt-on connectors 564a, 564b, and bolt-on connectors 566a, 566b, and bolt on connectors 568a, 568b. Connector 564a is a line connector, and connector 564b is a load connector for a vacuum bottle arrangement similar to that shown in cross section in FIG. 36. Connector 566a is a line connector and connector 566b is a load connector for a vacuum bottle contact as is shown in cross section in FIG. 36. Connector 568a is a line connector and connector 568b is a load connector for a vacuum contactor arrangement similar to that shown in cross section in FIG. 36. Contactor 500 as shown in FIG. 37 is adapted for use in controlling three phase alternating current through the use of the three sets of vacuum bottle contacts associated with the three sets of line and load contacts. Operating coil 510 is mounted in substantially the center of contactor 500. By being mounted in the center, operating coil 510 produces symmetrical forces in armature 502 and in the three corresponding arms 506. There is an arm (not shown) corresponding to arm 506 for each of the three vacuum bottles. It is advantageous to have the operating coul mounted in the center of the armature in order to provide symmetrical and balanced forces on the moving components of the armature such as the arms 506 and the movable contacts 530 in the respective three vacuum bottles.

In the alternative embodiment of the vacuum breaker contactor as shown in FIG. 37, no wheels are attached to the contactor, rather slides 570 and 572 replace wheels. Slides 570 and 572 matingly slide along rails 164a, 164b. Thus contactor 500 as shown in FIG. 37 may be slid into place on rails 164a, 164b, and contacts 564a, 564b, and 566a, 566b, and 568a, 568b may be bolted into place on the contactor receptacle.

Support 580 may be made, for example, from glass filled polyester and produced in a molding process. Support 580 is supported by side plates 582, 584. Also, side plates 582, 584 support bearing 505, and a corresponding bearing (not shown) for the other end of axle 504.

Figure 38:
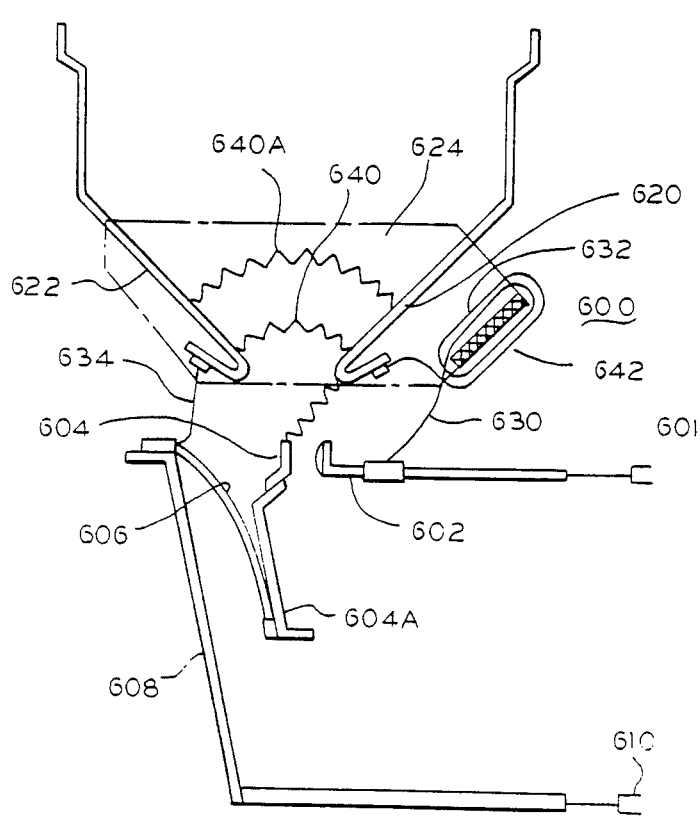
FIG. 38 is a circuit diagram of an air break contactor.

An air break contactor is illustrated in FIG. 38 through FIG. 46. As shown in FIG. 38, blow out coil 600 is electrically connected to connector 601. Also, stationary contact 602 is electrically connected to connector 601. Connector 601 is the line side connector of an air break contactor. The lower end 604A of movable contact 604 is connected by flexible conductor 606 to conducting rod 608. Conducting rod 608 connects electrically to load side connector 610.

Arc runner 620 is located near stationary contact 602. Arc runner 622 is located near movable contactor 604 when the movable contact is in the open position. When the operating coil for the air break contactor is energized movable contact 604 makes electrical contact with stationary contact 602. De-energization of the operating coil allows a spring (not shown) to drive movable contact 604 away from stationary contact 602. An electric arc builds up in a space between stationary contact 602 and movable contact 604 when a load current is interrupted by opening the contacts.

Blow out coil 600 generates a magnetic field which is applied to the arc. Blow out coil 600 may be, for example, two (2) turns of wire around magnetic core 642. The arc first develops between stationary contact 602 and movable contact 604. The arc then transfers to arc runner 620 and to arc runner 622. Lead 630 of blow out coil 600 is electrically connected to contact 601. Lead 632 of blow out coil 600 is electrically connected to arc runner 620. Arc runner 622 is electrically connected to connector 610 through conductor 634. When the arc transfers from stationary contact 602 to arc runner 620, then an electric circuit is made from connector 601 through conductor 630 to blow out coil 600, and from blow out coil 600 through conductor 632 to arc runner 620, through arc 640 to arc runner 622, and then through conductor 634 to connector 610. The current flow through blow out coil 600 produces a magnetic field. Magnetic iron core 642, about which blow out coil 600 is wrapped, produces a magnetic field. Magnetic pole piece 624 is magnetically coupled to core 642. As shown in FIG. 38, magnetic pole piece 624 is below the plane of the drawing. A corresponding pole piece above the plane of the drawing is also magnetically coupled to core 642. Thus, the cooperation between blow out coil 600, magnetic core 642, and the two magnetic pole pieces 624, and the one not shown, produce a relatively uniform magnetic field through the region in which arc 640 provides a conducting path. The presence of the magnetic field causes the arc to move rapidly upwards to a position such as 640a, and finally the length of the arc becomes too great and the arc is extinguished.

Figure 39:
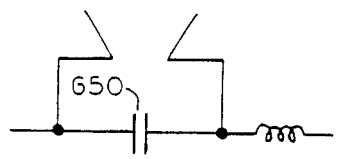
FIG. 39 and FIG. 40 are prior art schematic diagrams of an air break contactor.
Figure 40:
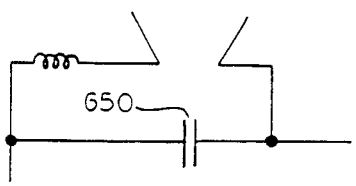
Figure 41:
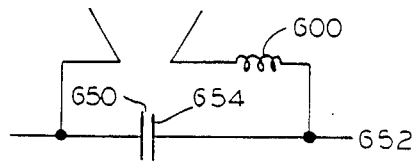
FIG. 41 is a schematic diagram of an air break contactor.

The electrical connection of blow out coils used in the prior art is shown in FIG. 39 and in FIG. 40. A blow out coil is shown connected in series with the load of the contactor in FIG. 39. A blow out coil is shown in series with an arc runner attached to a movable contact 650 in FIG. 40. The connection of blow out coil 600 as disclosed in the present invention is shown in FIG. 41. Blow out coil 600 is an electrical series between the line connection 652 and the arc runner located near stationary contact 654. An advantage of the location of the arc runner near the stationary contact is that the dimensional stability of the gap spacing between the arc runner and the stationary contact is relatively easy to control and maintain. A great disadvantage of the arrangement as shown in FIG. 40 is that the arc runner controlling current flow in the blow out coil is located near movable contact 650, and control of the arc gap length between the movable contact and the arc runner is difficult to maintain. The length of the gap can vary and the arc may not establish itself to the movable contact arc runner if the distances vary out of tolerance. The arrangement of the present invention is decidedly advantageous with respect to the prior art in that there is very little tendency for the spacing of the gap between the stationary contact 654 and the arc runner near it to vary with time. Thus, the arc can reliably be established between the two arc runners, that is it can be transferred away from the contacts and to the arc runner.

Figure 42:
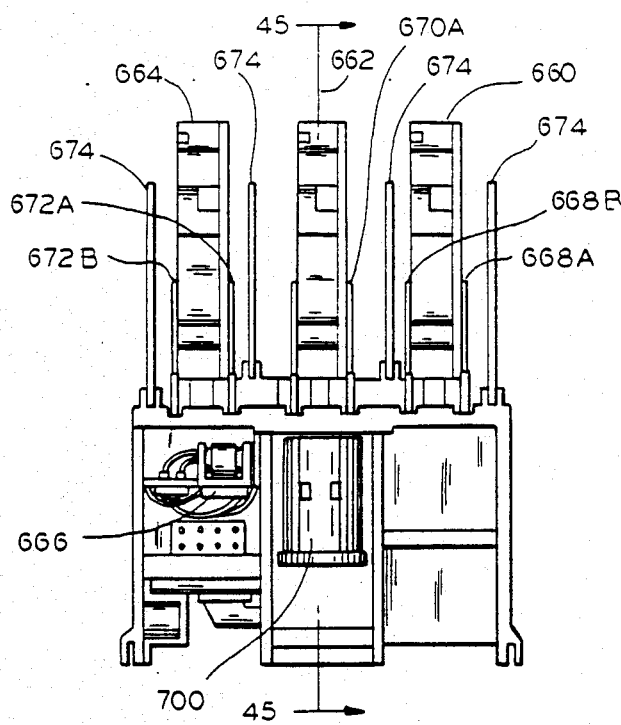
FIG. 42 is a side view of an air break contactor.

FIG. 42 shows an air gap contactor useful for use with three phase alternating current. Arc chutes 660, 662 and 664 cool the arc of respective contacts for respective phases. Control components 666 for the contactor are mounted on the back of the contactor for easy access. Magnetic pole pieces 668a and 668b provide a magnetic field for control of the arc in arc chute 660. Magnetic pole pieces 670a, 670b provide a magnetic field for the arc in arc chute 662. Magnetic pole pieces 672a, 672b provide a magnetic field for control of the arc in arc chute 664. Plates 674 provide insulating protection between the arc chutes of the three phases. The magnetic pole pieces may be made, for example, from several sheets of magnetizable steel held together by tack welds.

Figure 43:
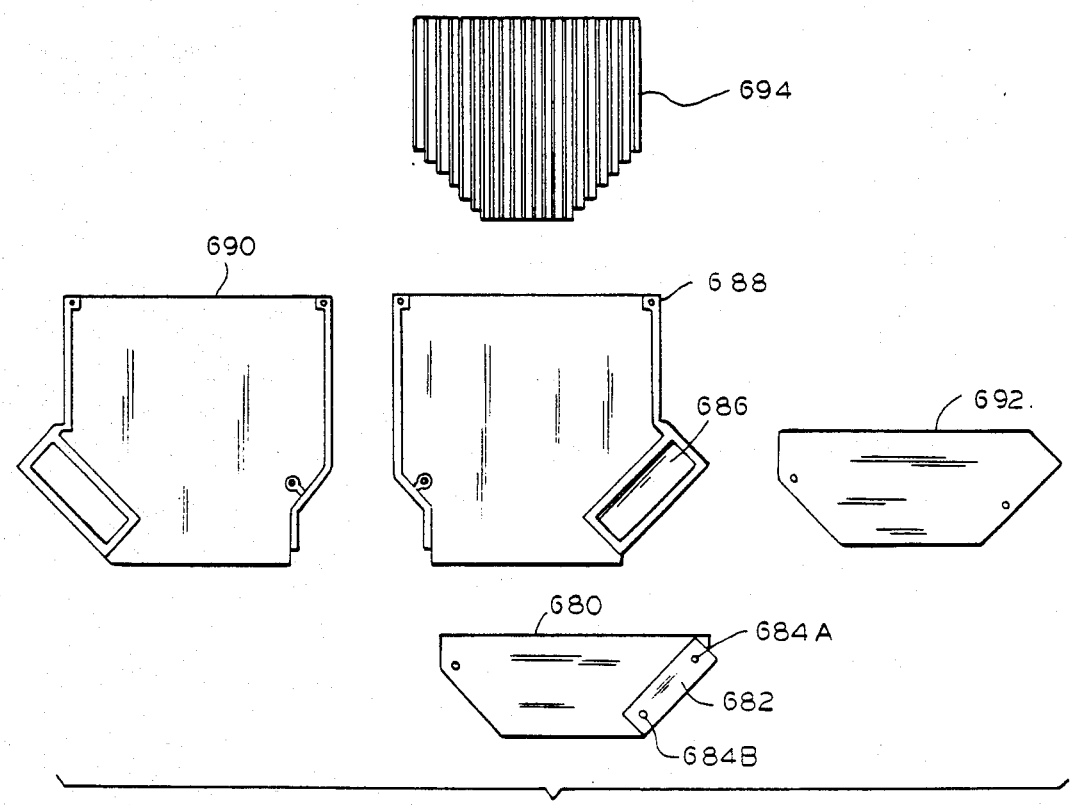
FIG. 43 is a partial assembly drawing of an arc chute for an air break contactor.

The internal construction of an arc chute is shown in assembly drawing FIG. 43. Pole piece 680 has magnetic core 682 mounted thereupon by rivets 684a, 684b. Pole piece 682 fits in opening 686 of a first side 688 of the arc chute. Second side 690 of the arc chute fits over first side 688. Pole piece 692 then fits outside of side 690 and makes magnetic contact with core 682. The pole pieces, 680, 692 fit on the exterior of the arc chute as shown in FIG. 42. Insulating core 694 provides a myriad of air passages through a refractory material. Core 694 fits within the arc chute and provides lengthening and cooling for the arc and promotes extinguishing of the arc.

Figure 44:
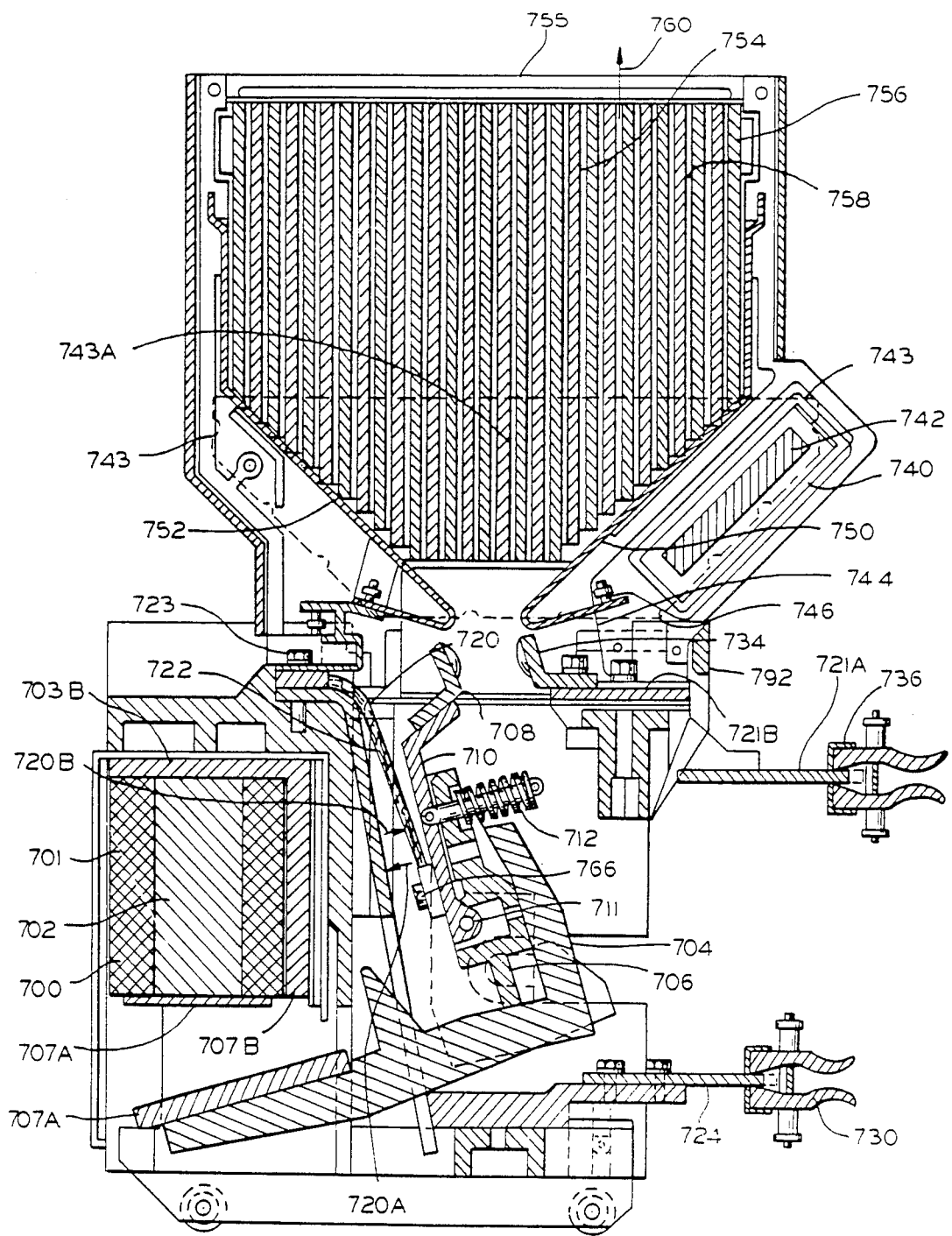
FIG. 44 is a sectional view of an air break contactor, as shown along sectional lines 45 in FIG. 42.

FIG. 44 shows a cross sectional view of an air break contactor. FIG. 44 is a cross section taken along cross sectional lines shown by arrows 45 in FIG. 42. Referring to FIG. 44, armature 704 pivots about point 706. Operating coil 700, as shown in both FIG. 44 and FIG. 42, when energized provides magnetic force to rotate armature 704 about its pivot point 706. Winding 701 of operating coil 700 is wound on magnetic core 702. Soft iron magnetic plate 703A is brought into contact with nonmagnetic gap plates 707a when operating coil 700 is energized by electric current flow. An air gap 707B is maintained when plate 703A is in contact with gap plate 707A. Magnetic iron yoke 703B provides a magnetic flux path for the operating coil 700.

Movable contact 708 is attached to arm 710. Arm 710 is hinged by pin 711 to armature 704. Overtravel spring 712 provides contact pressure between movable contact 708 and stationary contact 734 when armature 704 is rotated so that magnetic iron plate 703A is in contact with gap plate 707A.

Flexible conductor 720 is electrically attached to arm 710 near pivot pin 711. Flexible conductor 720 connects also to conducting rod 722 by bolt 723. Conducting rod 722 connects in turn to conductor 724 and to connector 730. Stationary contact 734 connects electrically to connector 736. Connector 736 is the line side connector for the air break contactor and connector 730 is the load side connector for the air break contactor. When movable contact 708 is in contact with stationary contact 734 an electrical circuit is made from connector 736, through contact 734 and 708, through conducting arm 710 to flexible conductor 720, and from flexible conductor 720 to conducting rod 722 and thence to connector 730. Thus, a current flow is established from an electric supply line through connector 736 to connector 730 and thence to an electric load.

Magnetic forces act on flexible conductor 720 from currents flowing in arm 710 and tend to move flexible conductor 720 in the direction 720A. Also, magnetic forces act on flexible conductor 720 from current flowing in conducting rod 722 and tend to move flexible conductor 720 in the direction shown by arrow 720B. The forces in directions 720A and 720B cause the flexible conductor 720 to take up an equilibrium position. The forces acting on arm 710 from currents flowing in conductors 721A, 721B, and 724 are reduced by the force produced by current flowing in flexible conductor 720.

This reduction in force acting on arm 710 results from partial cancellation of forces because of the substantially anti-parallel current paths through arm 710 and flexible conductor 720.

When operating coil 700 is de-energized, then armature 704 returns to the position as shown in FIG. 44 and breaks the electrical connection between stationary contact 734 and movable contact 708. In breaking the electrical connection between stationary contact 734 and movable contact 708 an electric arc is developed in the air surrounding the contacts. The electric arc is first established between the contacts, the arc then shifts from stationary contact 734 to arc runner 750. When the arc begins to flow from arc runner 750, then an electric current flow is established through conductor 744 through blow out coil 740 and thence to conductor 746 and to arc runner 750. All electric current flow from arc runner 750 through an arc passes through blow out coil 740. Blow out coil 740 is wrapped around a laminated magnetizable steel core 742. Magnetic core 742 is magnetically coupled to magnetic pol piece 743. Magnetic pole piece 743 is shown in FIGS. 42 and 43. In FIG. 43, magnetic pole piece 743 is shown as magnetic pole piece 680, 692. The magnetic pole pieces are attached to the exterior of the arc chute and provide a substantially uniform magnetic field throughout the region 743A. The magnetic field provided in the region 743A interacts with the arc flowing between arc runner 750 and movable contact 708 forcing the arc to move up to arc runner 752 and then to move further up into the core 754 of the arc chute 755.

Arc runner 752 is relatively close to movable contact 708 when movable contact 708 is in the open position. The close separation between arc runner 752 and movable contact 708 and the presence of the magnetic field produced by blow-out coil 740 promotes transfer of the arc to arc runner 752. The magnetic field further promotes travel of the arc up arc runner 750, 752 and promotes cooling and extinguishment of the arc.

The core 754 of arc chute 755 is made of a refractory material. Core 754 is composed of refractory columns 756 separated by air columns 758. This honeycomb structure promotes expansion and extinguishment of the arc. Arc gases may escape in the direction shown by arrow 760 from the top of the arc chute 755.

Operating coil 700 is mounted along the center line of the air break contactor as shown in FIG. 42. Thus, the operating coil appears in cross section in FIG. 44. It is advantageous to have the operating coil mounted along the center line of the air break contactor. By being mounted along the center line, the forces applied to the armature are uniformly distributed throughout the armature. A uniform distribution of forces within the armature minimizes bending and twisting of the armature under the influence of those forces.

The electrical connection of the blow-out coil 740 as shown on FIG. 44 is described in more detail in FIG. 38 and FIG. 41. The advantage of a blow-out coil connected to the arc runner adjacent to the stationary contact is that the spacing between the arc runner and the stationary contact may be accurately controlled by the geometry of the contactor. The accurate control of the spacing promotes transfer of the arc from the stationary contact to the arc runner. When an arc is established to the arc runner 750, or 620, in FIG. 38, an electric current begins to flow through blow-out coil 740, or 600 as in FIG. 38. Current flow through the blow-out coil applies a magnetic field to the arc and further promotes transfer of the arc from the movable contact to the arc runner associated with the movable contact, arc runner 752 or arc runner 622.

Figure 45:
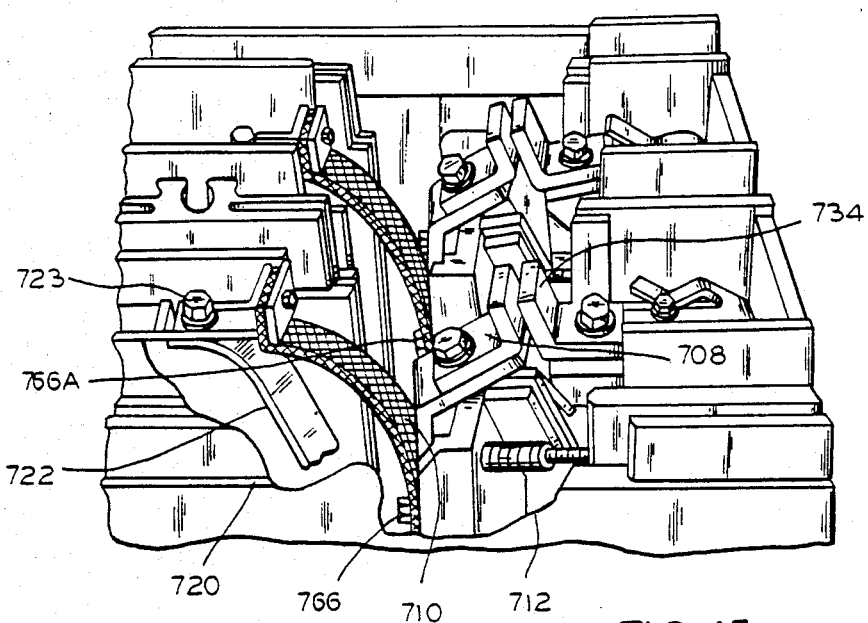
FIG. 45 is a perspective view of the contact of an air break contactor.

FIG. 45 is a perspective view showing movable contact 708 in the closed position in contact with stationary contact 734. Bolt 766 attaches flexible conductor 720 to arm 710. Bolt 723 connects flexible conductor 720 to conducting rod 722. Conducting rod 722, flexible conductor 720 and arm 710 form a "Z" shaped conducting path for electric current flow through stationary contact 734 to movable contact 708. A similar "Z" shaped current path is shown in FIG. 38 from movable contact 604 through conducting arm 604A, through flexible conductor 606 and conducting rod 608. The current flow through flexible conductor 606 and conducting rod 604A forms a "Z" current path. The "Z" shaped current path advantageously produces magnetic forces which oppose magnetic forces produced by current flow through conductors 721A, 721B, 710, and 724. This partial cancellation of magnetic forces reduces the tendency of the movable contact to break connection under the influence of the heavy current flows through the contacts experienced during short circuit conditions. The connection may be broken under the influence of heavy short circuit currents by arm 710 rotating about pin 711. When arm 710 rotates about pin 711, then spring 712 may cause the contacts to close. There is a good likelihood for the contacts to weld if they open and close during short circuit conditions. Also very heavy currents may cause the armature to rotate away from the closed condition. The attachment of the flexible conductor near the hinge point of arm 710 lengthens the current path in arm 710 and further increases the electric current flow needed to generate forces sufficient to blow the contacts apart either by rotating arm 710 about pin 711 or rotating the armature.

Figure 46:
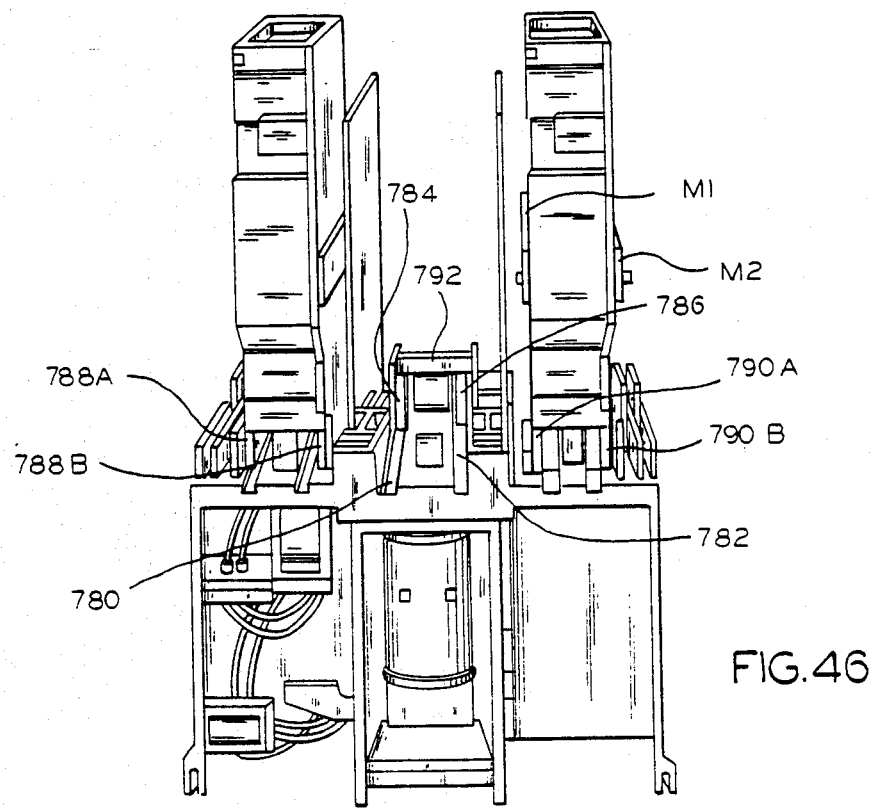
FIG. 46 is a perspective view of an air break contactor.

FIG. 46 is a perspective view of a three terminal air break contactor showing the arc chute for the central contact removed from the contactor. The arc chute rests on four tracks, tracks 780, 782, 784 and 786. Tracks 780, 782, 784, 786 are undercuts, that is notches, molded into the frame of the contactor. Projections on either side of the bottom of the arc chutes fit matingly into the tracks. The arc chutes may slide along the tracks for convenient installation and removal of the arc chutes. The two arc chutes shown in FIG. 46 are shown resting in tracks 788A, 788B and 790A, 790B, respectively, the equivalents of track 780 and 782. The arc chute may be lifted off of the contactor by simply picking it up from tracks 780, 782, 784 and 786. Or alternatively, the arc chute may slide along the tracks. The arc chutes seat against wall 792 when the arc chutes are properly positioned.

An air break contactor as illustrated in FIG. 46 may be used as contactor 150 as shown in FIG. 2. When the air break contactor is installed in the controller 100 as shown in FIG. 2, then the easy removal of the arc chutes resulting from their resting in tracks 780, 782, 784 and 786 facilitate service of the arc chutes. The arc chutes may be serviced by a serviceman from the rear of controller 100 when door 118 of the controller is standing open. Service is accomplished simply by reaching into the controller and lifting the arc chute out of tracks 780, 782, 784 and 786. Thus, the arc chute may be easily removed from the air break contactor while the air break contactor is installed in controller 100.

FIG. 47A, FIG. 47B and FIG. 48 show a stationary contact 800 for an isolation switch. Stationary contact 800 may serve as the stationary contact in an isolation switch 120 as shown in FIG. 2. Isolation switch 120 is shown in FIG. 3 along with stationary contact 202. Stationary contact 800 may serve as stationary contact 202 as shown in FIG. 3. Stationary contact 800 has jaws 806, 808 which grip isolation switchblade 176 by means of electrical contacts 814. Electrical contacts 814 may be made, for example, from a silver tungsten alloy. Jaw blades 806, 808 may be made, for example, from a phosphor bronze material. Springblades 810, 812 are held in place by pin 820. Pin 820 floats freely in hole 822 formed in base 802. Pin 820 may be made, for example, from stainless steel. Springblades 810, 812 may be made, for example, from spring steel.

Base 802 of stationary contact 800 may be attached to a convenient mounting conductor (not shown) by a threaded bolt screwing into threaded hole 804. Also spring pin 805 fits into hole 805A, and also fits into a mating hole in the mounting conductor (not shown) so as to prevent base 802 from twisting during operating of the switch.

Springblades 810, 812 hold jaws 806, 808 in physical and electrical contact with isolation switchblade 176. If isolation switchblade 176 undergoes lateral motion, that is, motion in the direction shown by arrow 824 or arrow 826, then springblades 810, 812 will hold contacts 814 in physical and electrical contact with switchblade 176. As switchblade 176 moves in the directions shown by arrows 824, 826 pin 820 moves back and forth in hole 822. By being able to move back and forth in hole 822, pin 820 permits springblades 810, 812 to follow the lateral motion of switchblade 176.

Springblade 810, 812, for example, may be a flat spring of width greater than the width of jaws 806, 808 as shown in FIG. 47A and FIG. 47B.

Springblades 810, 812 may have a rolled edge 813. Rolled edge 813 has a cutout 813A as shown in FIG. 47A and FIG. 47B so that jaw 806 fits into the cutout 813A. Cutout 813A prevents springblade 810, 812 from slipping off of jaw 806, 808, respectively.

Switchblade 176 may undergo lateral motion as a result of short circuit high currents passing through parallel conducting paths provided by its neighboring switchblades. As shown in FIG. 3, in FIG. 4, and in FIG. 8, switchblades 176 form parallel conducting electrical paths. Magnetic forces generated between the parallel switchblades 176 during short circuit conditions can provide sufficient force to cause lateral movement of the switchblades. The ability of pin 820 to move laterally in hole 822 maintains gripping pressure on switchblade 176 by contacts 814 as urged by spring blade 810, 812. Without the ability of pin 820 to move laterally in hole 822, switchblade 176 could move laterally away from one of the contacts 814 thereby breaking electrical connection during high current short circuit conditions. It is undesirable to break an electrical connection at the isolation switch during short circuit conditions. It is preferable that a fuse can blow to interrupt the short circuit connection rather than the switchblade interrupt the connection. When a switchblade interrupts the connection the high currents form an arc which may destroy the switchblade. A fuse is designed to interrupt the high currents experienced during short circuit conditions.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An improved electrical switch apparatus having:
    a first molding means for supporting an isolation switch and for supporting at least one line side power fuse clip, and at least one line side power fuse clip capable of retaining a first end of a power fuse fed by said isolation switch;
    a second molding means for supporting at least one load side power fuse clip, said at least one load side power fuse clip capable of retaining a second end of said power fuse;
    wherein the improvement comprises:
    at least one projection formed into said second molding means supporting a control circuit fuse, said at least one projection being substantially parallel to and beside a power fuse when a power fuse is installed in said apparatus;
    a control circuit line side fuse clip and a corresponding control circuit load side fuse clip mounted to each said projection formed into said second molding means, so that a control fuse and a power fuse are spaced apart and substantially parallel when both are installed in the apparatus.

2. The apparatus as in claim 1 further comprising:
    at least one socket for accepting a bus bar support.

3. The apparatus as in claim 1 further comprising:
    said first molding means having at least one socket formed therein, said socket formed in an upper surface of said first molding means, and said at least one line side power fuse clip attached to a lower surface of said first molding means;
    at least one post made of insulating material arranged to fit into said socket, said post having at least one shelf for supporting a bus bar said bus bar supported away from said first molding means by said post; and,
    means for attaching said bus bar to said post.

4. The apparatus as in claim 3 wherein said molding for said isolation switch has two said sockets formed therein.

5. The apparatus as in claim 3 wherein said at least one shelf is three shelves for supporting the conductors of a three phase alternating current bus bar so that said conductors are arranged vertically, one above the other.

6. The apparatus as in claim 3 wherein said at least one post is two posts.

7. The apparatus as in claim 1 further comprising:
a conductor for connecting said load side power fuse clip to said control circuit line side fuse clip, said conductor arranged to be substantially behind a terminal of said power fuse.

8. The apparatus as in claim 1 wherein said electrical switch apparatus controls a three phase alternating current line;
said at least one line side power fuse clip is three line side power fuse clips, one clip for each respective phase;
said at least one load side power fuse clip is three load side power fuse clips, one clip for each respective phase;
said at least one projection formed into said second molding means supporting a control circuit fuse is three projections, one projection for each respective phase;
each projection having a respective control circuit line side fuse clip and a respective control circuit load side fuse clip mounted thereon;
three power fuses, one mounted in each respective phase; and,
three control circuit fuses, one mounted on each respective projection formed into said second molding means, said respective control circuit fuses and said respective power fuses being spaced apart and substantially parallel.

9. The apparatus as in claim 1 wherein said electrical switch apparatus controls a three phase alternating current line;
wherein said first molding means has three spaces formed therein, said spaces separated by molded projections;
a contact and a blade of said isolation switch mounted in each said space, said contact and said blade forming an isolation switch for each said alternating current phase, said projections in said first molding means forming insulating barriers between said switches for each respective phase in order to prevent phase to phase short circuits by ionized gases produced by operation of said isolation switch.

10. An electrical switch apparatus comprising:
a first molding means for supporting an isolation switch and for supporting at least one line side power fuse clip, said at least one line side power fuse clip retaining a first end of a power fuse fed by said isolation switch;
a second molding means for supporting at least one load side power fuse clip, said at least one load side power fuse clip retaining a second end of said power fuse;
at least one projection formed into said second molding means supporting a control circuit fuse, said at least one projection being substantially parallel to and beside a power fuse when a power fuse is installed in said apparatus;
a control circuit line side fuse clip and a corresponding control circuit load side fuse clip mounted to each said projection formed into said second molding means, so that a control fuse and a power fuse are spaced apart and substantially parallel when both are installed in the apparatus.

11. A three phase alternating current electrical switch apparatus comprising:
a first molding means for supporting an isolation switch and for supporting three line side power fuse clips, one said line side power fuse clip for each respective alternating current phase, said at least one line line side power fuse clip capable of retaining a first end of a power fuse fed by said isolation switch;
said first molding means having at least one socket formed therein, said socket formed in an upper surface of said molding means, and said three line side power fuse clips attached to a lower surface of said first molding;
at least one post made of insulating material arranged to fit into said socket, said post having three shelves for supporting three bus bars, one said bus bar for each said alternating current phase, said three bus bars supported away from said first molding by said post;
means for attaching said three bus bars to said post;
a second molding means for supporting three load side power fuse clips, one said load side power fuse clip for each respective alternating current phase, said at least one load side power fuse clip capable of retaining a second end of said power fuse fed by said isolation switch;
three projections formed into said second molding means, each for supporting a control circuit fuse;
a control circuit line side fuse clip and a corresponding control circuit load side fuse clip mounted to each of said three projections, one for each said alternating current phase;
three power fuses, one mounted in each respective alternating current phase; and
three control circuit fuses, one mounted in each respective alternating current phase on each respective projection formed into said second molding means, said respective control circuit fuses and said respective power fuses being spaced apart and substantially parallel.

12. The apparatus as in claim 11 wherein said at least one socket is two sockets and said at least one post is two posts, each part fitting into a respective socket.

* * * * *